United States Patent
Mansour

(10) Patent No.: US 11,380,312 B1
(45) Date of Patent: Jul. 5, 2022

(54) RESIDUAL ECHO SUPPRESSION FOR KEYWORD DETECTION

(71) Applicant: Amazon Technologies, Inc., Seattle, WA (US)

(72) Inventor: Mohamed Mansour, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 355 days.

(21) Appl. No.: 16/447,550

(22) Filed: Jun. 20, 2019

(51) Int. Cl.
G10L 15/22 (2006.01)
G10L 15/20 (2006.01)
G10L 25/21 (2013.01)
G10L 25/60 (2013.01)
G10L 15/06 (2013.01)
G10L 15/08 (2006.01)
G10L 21/0232 (2013.01)
G10L 25/84 (2013.01)
G10L 21/0208 (2013.01)

(52) U.S. Cl.
CPC ............ *G10L 15/20* (2013.01); *G10L 15/063* (2013.01); *G10L 15/08* (2013.01); *G10L 15/22* (2013.01); *G10L 21/0232* (2013.01); *G10L 25/21* (2013.01); *G10L 25/60* (2013.01); *G10L 25/84* (2013.01); G10L 2015/088 (2013.01); G10L 2021/02082 (2013.01)

(58) Field of Classification Search
None
See application file for complete search history.

(56) References Cited

U.S. PATENT DOCUMENTS

| | | | | |
|---|---|---|---|---|
| 8,392,184 | B2* | 3/2013 | Buck | G10L 21/0208 |
| | | | | 704/232 |
| 9,530,407 | B2* | 12/2016 | Katuri | H04R 3/005 |
| 9,734,822 | B1* | 8/2017 | Sundaram | G10L 15/08 |
| 9,843,861 | B1* | 12/2017 | Termeulen | H04R 1/1016 |
| 9,972,343 | B1* | 5/2018 | Thorson | G10L 15/08 |
| 9,973,849 | B1* | 5/2018 | Zhang | H04R 3/005 |
| 10,134,425 | B1* | 11/2018 | Johnson, Jr. | G10L 15/05 |
| 10,157,611 | B1* | 12/2018 | Wolff | G10L 15/22 |
| 10,237,647 | B1* | 3/2019 | Chhetri | H04R 1/406 |
| 10,304,475 | B1* | 5/2019 | Wang | G10L 15/16 |
| 10,360,876 | B1* | 7/2019 | Rahman | G06F 1/1626 |

(Continued)

*Primary Examiner* — Seong-Ah A Shin
(74) *Attorney, Agent, or Firm* — Pierce Atwood LLP

(57) ABSTRACT

A system configured to improve wakeword detection. The system may selectively rectify (e.g., attenuate) a portion of an audio signal based on energy statistics corresponding to a keyword (e.g., wakeword). For example, a device may perform echo cancellation to generate isolated audio data, may use the energy statistics to calculate signal quality metric values for a plurality of frequency bands of the isolated audio data, and may select a fixed number of frequency bands (e.g., 5-10%) associated with lowest signal quality metric values. To detect a specific keyword, the system determines a threshold λ(f) corresponding to an expected energy value at each frequency band. During runtime, the device determines signal quality metric values by subtracting residual music from the expected energy values. Thus, the device attenuates only a portion of the total number of frequency bands that include more energy than expected based on the energy statistics of the wakeword.

20 Claims, 13 Drawing Sheets

(56) References Cited

U.S. PATENT DOCUMENTS

| | | | |
|---|---|---|---|
| 2003/0055535 A1* | 3/2003 | Voeller | G10L 15/26 704/E15.045 |
| 2010/0014690 A1* | 1/2010 | Wolff | H04R 3/005 381/92 |
| 2010/0183178 A1* | 7/2010 | Kellermann | H04R 25/552 381/94.1 |
| 2010/0246851 A1* | 9/2010 | Buck | G10L 21/0208 381/94.1 |
| 2012/0093338 A1* | 4/2012 | Levi | H04R 3/005 381/92 |
| 2012/0114138 A1* | 5/2012 | Hyun | H04R 3/005 381/92 |
| 2013/0117014 A1* | 5/2013 | Zhang | G10L 21/00 704/207 |
| 2013/0258813 A1* | 10/2013 | Herre | H04R 3/005 367/135 |
| 2013/0282373 A1* | 10/2013 | Visser | G10L 21/0208 704/231 |
| 2013/0308790 A1* | 11/2013 | Claussen | H04R 3/00 381/92 |
| 2013/0315402 A1* | 11/2013 | Visser | G10L 19/008 381/1 |
| 2014/0093091 A1* | 4/2014 | Dusan | H04R 1/1083 381/74 |
| 2014/0195247 A1* | 7/2014 | Parkinson | G06F 3/167 704/275 |
| 2015/0379992 A1* | 12/2015 | Lee | G06F 1/3206 704/275 |
| 2016/0014490 A1* | 1/2016 | Bar Bracha | H04J 3/0661 381/92 |
| 2016/0019907 A1* | 1/2016 | Buck | G10L 15/22 704/226 |
| 2016/0071526 A1* | 3/2016 | Wingate | G01S 3/807 704/233 |
| 2016/0118042 A1* | 4/2016 | Talwar | G10L 21/0208 704/233 |
| 2016/0241974 A1* | 8/2016 | Jensen | H04R 25/505 |
| 2016/0322045 A1* | 11/2016 | Hatfield | G10L 15/22 |
| 2017/0004840 A1* | 1/2017 | Jiang | G10L 21/0224 |
| 2017/0076749 A1* | 3/2017 | Kanevsky | G06F 3/16 |
| 2017/0195815 A1* | 7/2017 | Christoph | H04R 5/02 |
| 2017/0243586 A1* | 8/2017 | Civelli | G10L 15/30 |
| 2017/0263267 A1* | 9/2017 | Dusan | H04R 1/1083 |
| 2018/0033428 A1* | 2/2018 | Kim | G10L 15/22 |
| 2018/0068675 A1* | 3/2018 | Variani | G10L 19/008 |
| 2018/0096696 A1* | 4/2018 | Mixter | G10L 15/30 |
| 2018/0190290 A1* | 7/2018 | Campbell | G06F 3/167 |
| 2018/0197533 A1* | 7/2018 | Lyon | G10L 15/16 |
| 2018/0226064 A1* | 8/2018 | Seagriff | G10K 11/178 |
| 2018/0249246 A1* | 8/2018 | Kjems | H04R 3/005 |
| 2018/0262849 A1* | 9/2018 | Farmani | H04R 3/005 |
| 2018/0268808 A1* | 9/2018 | Song | G10L 15/063 |
| 2018/0350379 A1* | 12/2018 | Wung | G10L 21/0364 |
| 2019/0108837 A1* | 4/2019 | Christoph | G06F 3/167 |
| 2019/0214036 A1* | 7/2019 | Wurtz | G10K 11/17827 |
| 2019/0297435 A1* | 9/2019 | Pedersen | H04R 25/554 |
| 2019/0318733 A1* | 10/2019 | Mani | G10L 21/0208 |
| 2019/0318755 A1* | 10/2019 | Tashev | G10L 21/0232 |
| 2020/0105295 A1* | 4/2020 | Sereshki | G10L 15/22 |
| 2020/0175960 A1* | 6/2020 | Washio | G10L 15/005 |

\* cited by examiner

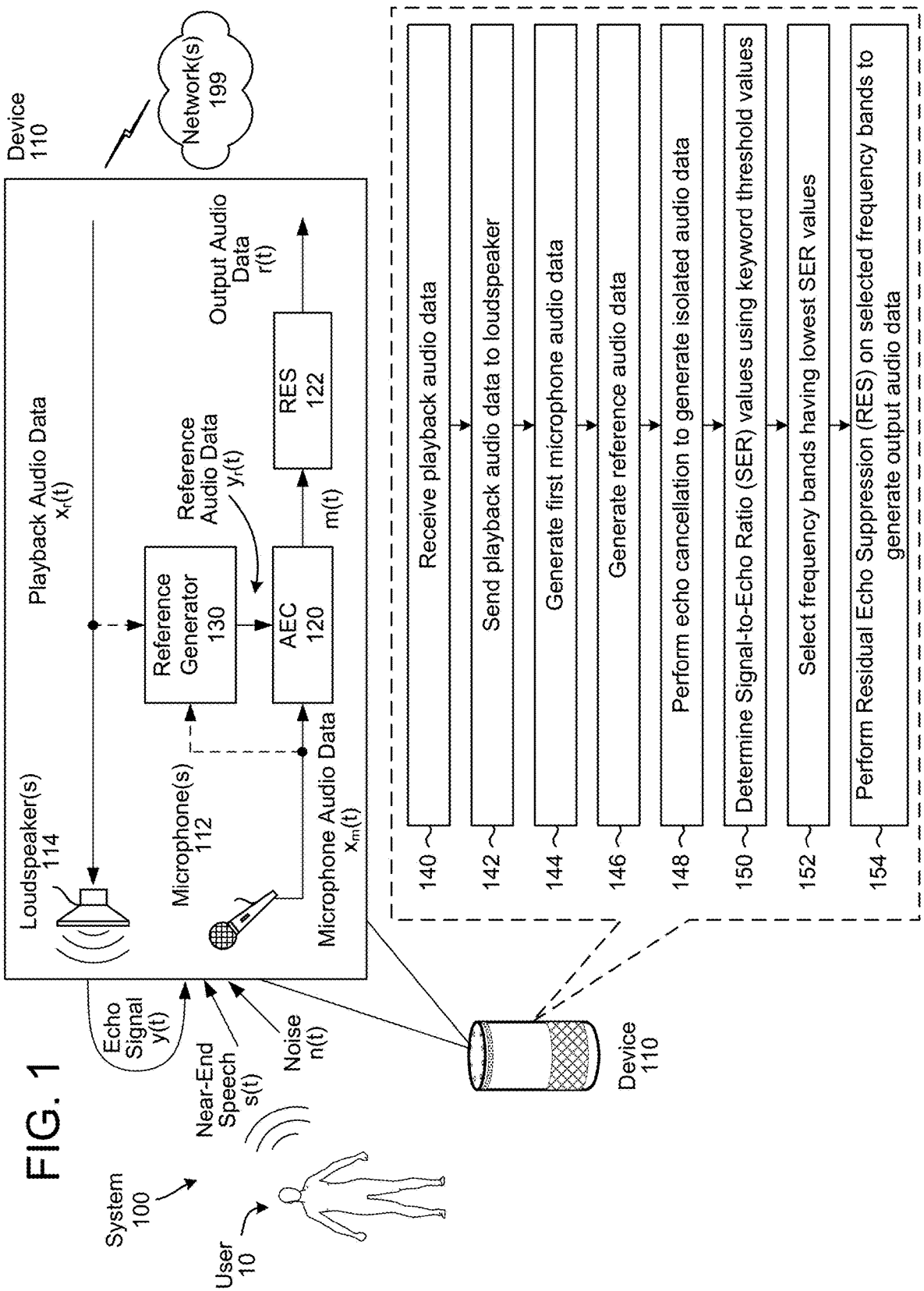

FIG. 6

| | |
|---|---|
| Expected Energy Value 610 | $Pr\{y(t, f) \geq \lambda(f)\} \leq 0.01$ |
| Echo Return Loss Enhancement (ERLE) 620 | $ELRE^{(t)}(f) = E\{\|Y^{(t)}(f)\|^2 - \|R^{(t)}(f)\|^2\}$ |
| Residual Music 630 | $E^{(t)}(f) = \|Y^{(t)}(f)\|^2 - ELRE^{(t)}(f)$ |
| Signal-to-Echo Ratio (SER) 640 | $\Psi(t, f) = \lambda(f) - E^{(t)}(f)$ |
| Threshold Comparison 650 | $\Psi(t, f) < \gamma$ |
| Pass-Through Output 660 | $r_{out}(t, f) = r(t, f)$ |
| Suppressed Output 670 | $r_{out}(t, f) = \dfrac{\Psi(t, f)}{\Psi(t, f)+1} r(t, f)$    Filtered Output 672 |
| | $r_{out}(t, f) = 0$    Binary Output 674 |

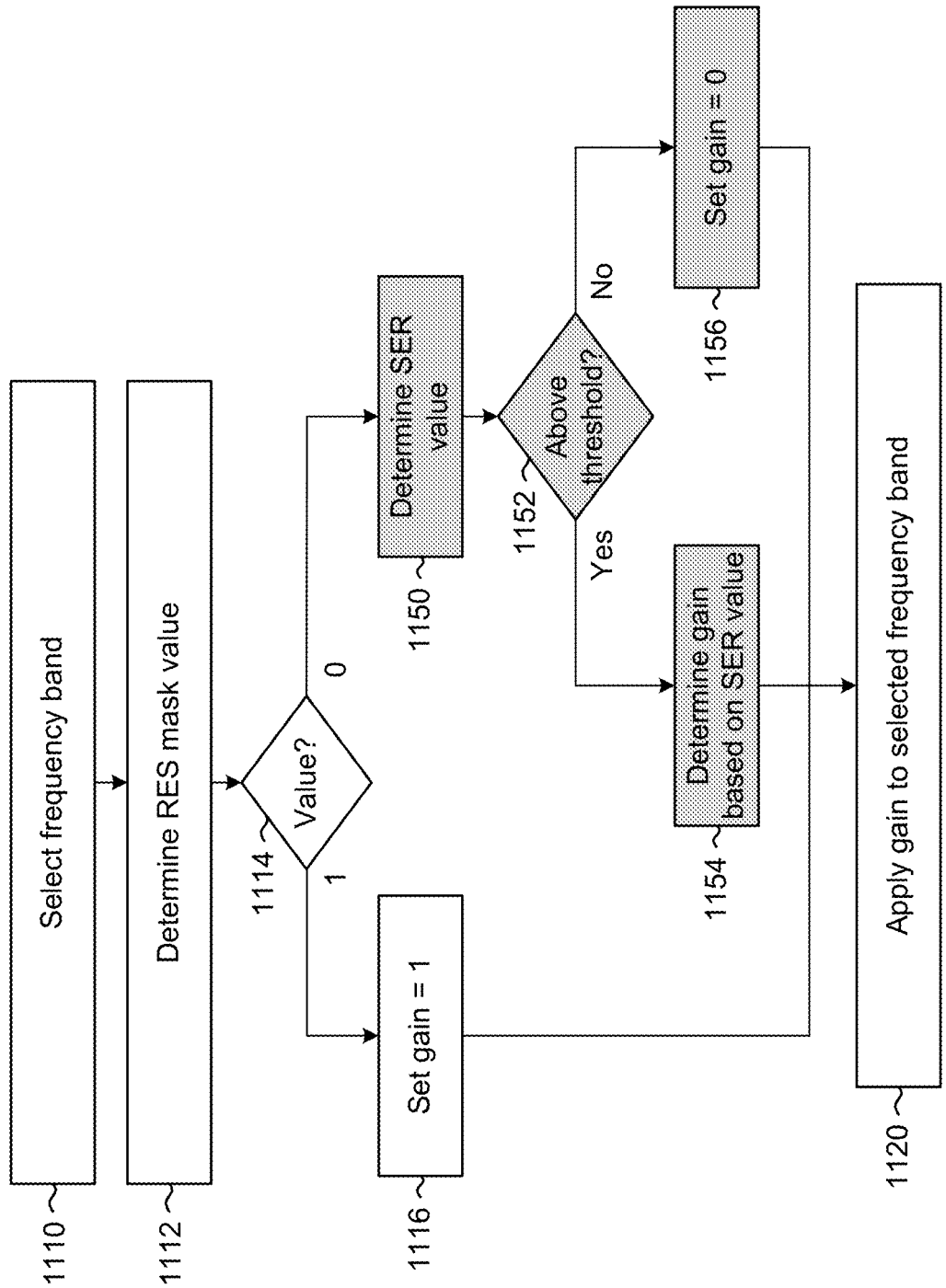

RESIDUAL ECHO SUPPRESSION FOR KEYWORD DETECTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIG. 6 illustrates examples of signal quality metrics according to embodiments of the present disclosure.

FIGS. 11A-11C are flowcharts conceptually illustrating example methods for performing residual echo suppression according to embodiments of the present disclosure.

DETAILED DESCRIPTION

Figure 2A:
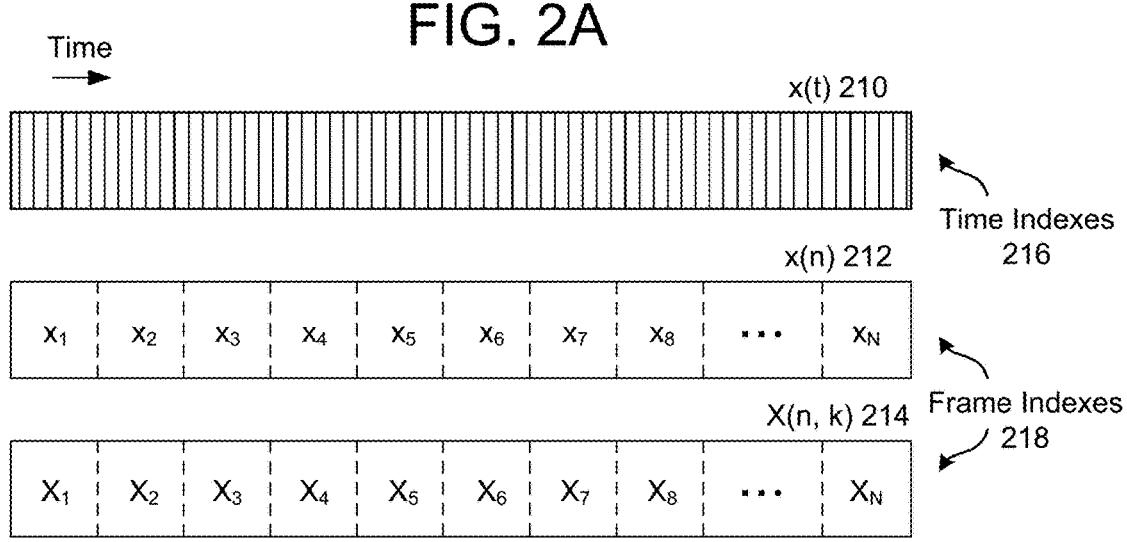
FIGS. 2A-2C illustrate examples of frame indexes, tone indexes, and channel indexes.

Electronic devices may be used to capture and process audio data. The audio data may be used for voice commands and/or may be output by loudspeakers as part of a communication session. In some examples, loudspeakers may generate audio using playback audio data while a microphone generates local audio data. An electronic device may perform audio processing, such as acoustic echo cancellation (AEC), residual echo suppression (RES), and/or the like, to remove an "echo" signal corresponding to the playback audio data from the local audio data, isolating local speech to be used for voice commands and/or the communication session.

Due to internal coupling and nonlinearity in the acoustic path from the loudspeakers to the microphone, performing AEC processing may result in distortion and other signal degradation such that the local speech includes a strong residual echo component. In some examples, this distortion may be caused by imprecise time alignment between the playback audio data and the local audio data, which may be caused by variable delays, dropped packets, clock jitter, clock skew, and/or the like. The residual echo component of the signal may interfere with detecting a specific keyword used to represent a beginning of a voice command (e.g., wakeword detection). Thus, even a powerful AEC algorithm can have a strong residual echo component that may decrease a performance of wakeword detection.

To improve wakeword detection, devices, systems and methods are disclosed that selectively rectify (e.g., attenuate) a portion of an audio signal based on energy statistics corresponding to a keyword (e.g., wakeword). For example, a device may perform echo cancellation to generate isolated audio data, may use the energy statistics to calculate signal quality metric values for a plurality of frequency bands of the isolated audio data, and may select a fixed number of frequency bands (e.g., 5-10%) associated with lowest signal quality metric values on which to perform residual echo suppression. To detect a specific keyword (e.g., wakeword such as "Alexa," "Echo," "Computer," etc.), the system may acquire training data corresponding to the keyword, determine an empirical cumulative density function of the energy at each frequency band over the entire utterance, and determine a threshold $\lambda(f)$ corresponding to an expected energy value at each frequency band. During runtime, the device may determine signal quality metric values by subtracting an amount of residual music or residual echo from a corresponding expected energy value. Thus, the device may attenuate only a portion of the total number of frequency bands that include more energy than expected based on the energy statistics of the wakeword.

FIG. 1 illustrates a high-level conceptual block diagram of a system 100 configured to perform acoustic echo cancellation (AEC) and then selectively perform residual echo suppression (RES). For example, the system 100 may be configured to perform RES using energy statistics corresponding to target speech, such as a wakeword, improving wakeword detection even when loud echo signals and/or environmental noise is present. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 that may be communicatively coupled to network(s) 199 and may include one or more microphone(s) 112 in a microphone array and/or one or more loudspeaker(s) 114. However, the disclosure is not limited thereto and the device 110 may include additional components without departing from the disclosure. While FIG. 1 illustrates the loudspeaker(s) 114 being internal to the device 110, the disclosure is not limited thereto and the loudspeaker(s) 114 may be external to the device 110 without departing from the disclosure. For example, the loudspeaker(s) 114 may be separate from the device 110 and connected to the device 110 via a wired connection and/or a wireless connection without departing from the disclosure.

The device 110 may be an electronic device configured to send audio data to and/or receive audio data. For example, the device 110 (e.g., local device) may receive playback audio data $x_r(t)$ (e.g., far-end reference audio data) from a remote device and the playback audio data $x_r(t)$ may include remote speech, music, and/or other output audio. In some examples, the user 10 may be listening to music or a program and the playback audio data $x_r(t)$ may include the music or other output audio (e.g., talk-radio, audio corresponding to a broadcast, text-to-speech output, etc.). However, the disclosure is not limited thereto and in other examples the user 10 may be involved in a communication session (e.g., conversation between the user 10 and a remote user local to the remote device) and the playback audio data $x_r(t)$ may include remote speech originating at the remote device. In both examples, the device 110 may generate output audio corresponding to the playback audio data $x_r(t)$ using the one or more loudspeaker(s) 114. While generating the output audio, the device 110 may capture microphone audio data $x_m(t)$ (e.g., input audio data) using the one or more microphone(s) 112. In addition to capturing desired speech (e.g., the microphone audio data includes a representation of local speech from a user 10), the device 110 may capture a portion of the output audio generated by the loudspeaker(s) 114 (including a portion of the music and/or remote speech), which may be referred to as an "echo" or echo signal, along with additional acoustic noise (e.g., undesired speech, ambient acoustic noise in an environment around the device 110, etc.), as discussed in greater detail below.

For ease of illustration, the disclosure may refer to audio data and/or an audio signal. For example, some audio data may be referred to as playback audio data $x_r(t)$, microphone audio data $x_m(t)$, error audio data m(t), output audio data r(t), and/or the like. Additionally or alternatively, this audio data may be referred to as audio signals such as a playback signal $x_r(t)$, microphone signal $x_m(t)$, error signal m(t), output audio data r(t), and/or the like without departing from the disclosure.

In some examples, the microphone audio data $x_m(t)$ may include a voice command directed to a remote server(s), which may be indicated by a keyword (e.g., wakeword). For example, the device 110 detect that the wakeword is represented in the microphone audio data $x_m(t)$ and may send the microphone audio data $x_m(t)$ to the remote server(s). Thus, the remote server(s) may determine a voice command represented in the microphone audio data $x_m(t)$ and may perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeaker(s) 114, capture audio using microphone(s) 112, or the like), multimedia devices (e.g., play videos using a display, such as a television, computer, tablet or the like), smart home devices (e.g., change temperature controls, turn on/off lights, lock/unlock doors, etc.) or the like.

Additionally or alternatively, in some examples the device 110 may send the microphone audio data $x_m(t)$ to the remote device as part of a Voice over Internet Protocol (VoIP) communication session or the like. For example, the device 110 may send the microphone audio data $x_m(t)$ to the remote device either directly or via remote server(s) and may receive the playback audio data $x_r(t)$ from the remote device either directly or via the remote server(s). During the communication session, the device 110 may also detect the keyword (e.g., wakeword) represented in the microphone audio data $x_m(t)$ and send a portion of the microphone audio data $x_m(t)$ to the remote server(s) in order for the remote server(s) to determine a voice command.

Prior to sending the microphone audio data $x_m(t)$ to the remote device/remote server(s), the device 110 may perform acoustic echo cancellation (AEC), adaptive interference cancellation (AIC), residual echo suppression (RES), and/or other audio processing to isolate local speech captured by the microphone(s) 112 and/or to suppress unwanted audio data (e.g., echoes and/or noise). As illustrated in FIG. 1, the device 110 may receive the playback audio data $x_r(t)$ and may generate playback audio (e.g., echo signal y(t)) using the loudspeaker(s) 114. The playback audio data $x_r(t)$ may be referred to as playback audio data, a playback signal, a far-end reference signal, far-end reference audio data, and/or the like. The one or more microphone(s) 112 in the microphone array may capture microphone audio data $x_m(t)$, which may be referred to as microphone audio data, a microphone signal, a near-end reference signal, near-end audio data, input audio data, and/or the like, which may include the echo signal y(t) along with near-end speech s(t) from the user 10 and noise n(t).

In audio systems, acoustic echo cancellation (AEC) processing refers to techniques that are used to recognize when a device has recaptured sound via microphone(s) after some delay that the device previously output via loudspeaker(s). The device may perform AEC processing by subtracting a delayed version of the original audio signal (e.g., playback audio data $x_r(t)$) from the captured audio (e.g., microphone audio data $x_m(t)$), producing a version of the captured audio that ideally eliminates the "echo" of the original audio signal, leaving only new audio information. For example, if someone were singing karaoke into a microphone while prerecorded music is output by a loudspeaker, AEC processing can be used to remove any of the recorded music from the audio captured by the microphone, allowing the singer's voice to be amplified and output without also reproducing a delayed "echo" of the original music. As another example, a media player that accepts voice commands via a microphone can use AEC processing to remove reproduced sounds corresponding to output media that are captured by the microphone, making it easier to process input voice commands.

To perform echo cancellation, the device 110 may include a reference generator 130 that is configured to generate reference audio data $y_r(t)$ that corresponds to the echo signal y(t). In some examples, the reference generator 130 may generate the reference audio data $y_r(t)$ based on the playback audio data $x_r(t)$. However, the disclosure is not limited thereto and in other examples, the reference generator 130 may generate the reference audio data $y_r(t)$ based on the microphone audio data $x_m(t)$ without departing from the disclosure. Thus, FIG. 1 illustrates both potential inputs to the reference generator 130 using dashed lines to indicate that the inputs are optional and may vary depending on the device 110.

To isolate the local speech (e.g., near-end speech s(t) from the user 10), the device 110 may include an AEC component 120 that subtracts the reference audio data $y_r(t)$ from the microphone audio data $x_m(t)$ to generate an error signal m(t). While FIG. 1 illustrates the AEC component 120 receiving the reference audio data $y_r(t)$ from the reference generator 130, the reference generator 130 may be included in the AEC component 120 without departing from the disclosure. Additionally or alternatively, while FIG. 1 illustrates the AEC component 120 as performing echo cancellation, this is intended for ease of illustration and the disclosure is not limited thereto. Instead, the AEC component 120 may perform acoustic echo cancellation (AEC), adaptive noise cancellation (ANC), acoustic interference cancellation (AIC), and/or the like without departing from the disclosure.

For ease of illustration, FIG. 1 illustrates the playback audio data $x_r(t)$, the microphone audio data $x_m(t)$, and the reference audio data $y_r(t)$ as audio signals in the time-domain. As will be described in greater detail below, the device 110 may convert these signals to the frequency-domain or subband-domain in order to generate the reference audio data, perform AEC, and/or perform additional audio processing.

While the AEC component 120 removes a portion of the echo signal y(t) from the microphone audio data $x_m(t)$, the output of the AEC component 120 (e.g., error signal m(t)) may include the near-end speech s(t) along with portions of the echo signal y(t) and/or the noise n(t) (e.g., difference between the reference audio data $y_r(t)$ and the actual echo signal y(t) and noise n(t)). To further isolate the local speech, the device 110 may include a residual echo suppression (RES) component 122 to perform RES processing on the error signal m(t) to generate output audio data r(t).

In conventional systems, a device may perform RES by attenuating the error signal m(t) based on system conditions. For example, during a communication session the device may attenuate all frequency bands when only remote speech is present (e.g., far-end single-talk conditions) and pass all frequency bands when only local speech is present (e.g., near-end single-talk conditions). When both remote speech and local speech is present (e.g., double-talk conditions), the device may pass a first portion of the error signal m(t) and attenuate a second portion of the error signal m(t).

To improve wakeword detection, the RES component 122 may be configured to selectively rectify (e.g., attenuate) a portion of the error signal m(t) based on energy statistics corresponding to the wakeword (e.g., target speech). For example, the RES component 122 may use the energy statistics to calculate signal quality metric values for a plurality of frequency bands and may select a fixed number of frequency bands associated with lowest signal quality metric values. The fixed number of frequency bands to select may be determined based on a maximum percentage (e.g., 5% or 10%) of the total number of frequency bands. Thus, the RES component 122 may attenuate only a portion of the total number of frequency bands that include more energy than expected based on the energy statistics of the wakeword. For ease of illustration, the RES component 122 will be described with regard to detecting a wakeword, although the disclosure is not limited thereto and the RES component 122 may be used to detect any keyword without departing from the disclosure.

To detect a specific keyword (e.g., wakeword such as "Alexa," "Echo," "Computer," etc.), the system 100 may acquire training data corresponding to the keyword, study spectral components of the training data and model a spectral fingerprint associated with the keyword. For example, the training data may correspond to a number of keyword utterances from diverse speakers recorded in noise-free environment. Based on the training data, the system 100 may determine an empirical cumulative density function of the energy at each frequency band (e.g., subband) over the entire utterance. The system 100 may perform this keyword modeling and output a threshold $\lambda(f)$ of the β-percentile point of the energy at frequency f at the center of each frequency band. For example, if β is the $99^{th}$-percentile point, and γ(t, f) is the energy of the keyword at frame t, then the probability can be expressed as:

$$Pr\{\gamma(t,f) \geq \lambda(f)\} \leq 0.01 \qquad [1]$$

where the speech level (e.g., expected energy value) at each frequency band is set to $\lambda(f)$ to compute a time-frequency mask. Thus, the expected energy value corresponds to a threshold amount of energy determined using a desired percentile value and the cumulative density function of the energy of the training audio data corresponding to the frequency band.

To select only the fixed number of frequency bands, the system 100 may determine signal quality metric values based on the expected energy values (e.g., plurality of threshold values) determined above. For example, the system 100 may determine first signal quality metric values (e.g., residual music values) representing an amount of residual music or residual echo (e.g., portion of the error signal m(t) that does not correspond to local speech s(t)) for individual frequency bands and then may determine second signal quality metric values (e.g., Signal-to-Echo Ratio (SER) values) by subtracting the first signal quality metric values from a corresponding expected energy value, as will be described in greater detail below with regard to FIG. 6.

As will be described in greater detail below, the RES component 122 may generate RES mask data indicating time-frequency bands that are associated with the fixed number of lowest SER values. For example, if the RES component 122 uses 512 individual frequency bands, the RES component 122 may select up to 26 (e.g., 5%) or 51 (e.g., 10%) of the frequency bands having the lowest SER values to rectify. While the example described above illustrates the fixed number as a percentage of the total number of frequency bands, the disclosure is not limited thereto and the fixed number may be a predetermined value and/or may vary without departing from the disclosure. Additionally or alternatively, while the example described above illustrates the fixed number being constant over time, the disclosure is not limited thereto and the maximum number of frequency bands to select may vary depending on system conditions. For example, the system 100 may determine a global SER value (e.g., SER value across all frequency bands) and determine the maximum number of frequency bands based on the global SER value. In some examples, the maximum number is inversely proportional to the global SER value, such that the maximum number may be lower (e.g., 26 or 5%) when the global SER value is relatively low and may be higher (e.g., 51 or 10%) when the global SER value is relatively high.

In some examples, the RES component 122 may only select SER values below a threshold value (e.g., 0 dB), indicating that these frequency bands include more energy than expected for the specific wakeword, although the disclosure is not limited thereto. To generate the output audio data r(t), the RES component 122 may apply the RES mask data to the error signal m(t) to rectify portions of the error signal m(t) corresponding to the selected frequency bands.

As illustrated in FIG. 1, the device 110 may receive (140) playback audio data and may send (142) the playback audio data to the loudspeaker(s) 114. The device 110 may generate (144) first microphone audio data using at least one microphone 112, may generate (146) reference audio data corresponding to the echo signal y(t), and may perform (148) echo cancellation (e.g., AEC) to generate isolated audio data (e.g., error signal m(t)).

After performing echo cancellation, the device 110 may determine (150) signal-to-echo ratio (SER) values using keyword threshold values, may select (152) frequency bands having lowest SER values, and may perform (154) residual echo suppression (RES) on the selected frequency bands to generate output audio data (e.g., output audio data r(t)). As part of selecting the frequency bands having lowest SER values, the device 110 may generate RES mask data indicating the selected frequency bands, although the disclosure is not limited thereto. Additionally or alternatively, the device 110 may only select up to a fixed number of frequency bands. Selecting the lowest SER values may correspond to determining that the SER values satisfy a condition, although the disclosure is not limited thereto and the device 110 may determine that the SER values satisfy a condition using other techniques known to one of skill in the art.

In some examples, the device 110 may operate microphone(s) 112 using beamforming techniques to isolate desired audio including speech. In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system.

While not illustrated in FIG. 1, the device 110 may include a beamformer component that may perform beamforming prior to the AEC component 120 and/or after the RES component 122 without departing from the disclosure. In some examples, the device 110 may include an individual RES component 122 for each of the microphone(s) 112 and the beamformer component may perform beamforming based on the output audio data r(t) generated by the RES components 122, as described in greater detail below with regard to FIG. 4. However, the disclosure is not limited thereto and in other examples the device 110 may perform beamforming using the microphone audio data $x_m(t)$ such that the AEC component 120 performs echo cancellation on a first portion of the microphone audio data $x_m(t)$ (e.g., target signal). Additionally or alternatively, the reference audio data $y_r(t)$ may correspond to a second portion of the microphone audio data $x_m(t)$ (e.g., reference signal) without departing from the disclosure.

One technique for beamforming involves boosting audio received from a desired direction while dampening audio received from a non-desired direction. In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesireable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

In addition to or as an alternative to generating the reference signal based on the playback audio data, Adaptive Reference Algorithm (ARA) processing may generate an adaptive reference signal based on the input audio data. To illustrate an example, the ARA processing may perform beamforming using the input audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform Adaptive Interference Cancellation (AIC) (e.g., adaptive acoustic interference cancellation) by removing the reference signal from the target signal. As the input audio data is not limited to the echo signal, the ARA processing may remove other acoustic noise represented in the input audio data in addition to removing the echo. Therefore, the ARA processing may be referred to as performing AIC, adaptive noise cancellation (ANC), AEC, and/or the like without departing from the disclosure.

The device 110 may include an adaptive beamformer and may be configured to perform AIC using the ARA processing to isolate the speech in the input audio data. The adaptive beamformer may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal strength values or signal quality metrics (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the adaptive beamformer may identify the reference signal(s) based on the signal strength values and/or using other inputs without departing from the disclosure. Thus, the target signal(s) and/or the reference signal(s) selected by the adaptive beamformer may vary, resulting in different filter coefficient values over time.

As discussed above, the device 110 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones 112 in the microphone array (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficients associated with specific directions. For example, the device 110 may perform a first directional calculation by applying first filter coefficients to the input audio signals to generate the first beamformed audio data and may perform a second directional calculation by applying second filter coefficients to the input audio signals to generate the second beamformed audio data.

The filter coefficients used to perform the beamforming operation may be calculated offline (e.g., preconfigured ahead of time) and stored in the device 110. For example, the device 110 may store filter coefficients associated with hundreds of different directional calculations (e.g., hundreds of specific directions) and may select the desired filter coefficients for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficients) being referred to as a "first beam" corresponding to the first direction, the second directional calculation (e.g., second filter coefficients) being referred to as a "second beam" corresponding to the second direction, and so on. Thus, the device 110 stores hundreds of "beams" (e.g., directional calculations and associated filter coefficients) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficients used to generate the first beam.

An audio signal is a representation of sound and an electronic representation of an audio signal may be referred to as audio data, which may be analog and/or digital without departing from the disclosure. For ease of illustration, the disclosure may refer to either audio data (e.g., far-end reference audio data or playback audio data, microphone audio data, near-end reference data or input audio data, etc.) or audio signals (e.g., playback signal, far-end reference signal, microphone signal, near-end reference signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

As used herein, audio signals or audio data (e.g., far-end reference audio data, near-end reference audio data, microphone audio data, or the like) may correspond to a specific range of frequency bands. For example, far-end reference audio data and/or near-end reference audio data may correspond to a human hearing range (e.g., 20 Hz-20 kHz), although the disclosure is not limited thereto.

As used herein, a frequency band corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Playback audio data $x_r(t)$ (e.g., far-end reference signal) corresponds to audio data that will be output by the loudspeaker(s) 114 to generate playback audio (e.g., echo signal $y(t)$). For example, the device 110 may stream music or output speech associated with a communication session (e.g., audio or video telecommunication). In some examples, the playback audio data may be referred to as far-end reference audio data, loudspeaker audio data, and/or the like without departing from the disclosure. For ease of illustration, the following description will refer to this audio data as playback audio data or reference audio data. As noted above, the playback audio data may be referred to as playback signal(s) $x_r(t)$ without departing from the disclosure.

Microphone audio data $x_m(t)$ corresponds to audio data that is captured by one or more microphone(s) 112 prior to the device 110 performing audio processing such as AEC processing. The microphone audio data $x_m(t)$ may include local speech $s(t)$ (e.g., an utterance, such as near-end speech generated by the user 10), an "echo" signal $y(t)$ (e.g., portion of the playback audio $x_r(t)$ captured by the microphone(s) 112), acoustic noise $n(t)$ (e.g., ambient noise in an environment around the device 110), and/or the like. As the microphone audio data is captured by the microphone(s) 112 and captures audio input to the device 110, the microphone audio data may be referred to as input audio data, near-end audio data, and/or the like without departing from the disclosure. For ease of illustration, the following description will refer to this signal as microphone audio data. As noted above, the microphone audio data may be referred to as a microphone signal without departing from the disclosure.

An "echo" signal $y(t)$ corresponds to a portion of the playback audio that reaches the microphone(s) 112 (e.g., portion of audible sound(s) output by the loudspeaker(s) 114 that is recaptured by the microphone(s) 112) and may be referred to as an echo or echo data $y(t)$.

Output audio data corresponds to audio data after the device 110 performs audio processing (e.g., AIC processing, ANC processing, AEC processing, RES processing, and/or the like) to isolate the local speech $s(t)$. For example, the output audio data $r(t)$ corresponds to the microphone audio data $x_m(t)$ after subtracting the reference signal(s) (e.g., using AEC component 120), performing residual echo suppression (e.g., using RES component 122), and/or other audio processing known to one of skill in the art. As noted above, the output audio data may be referred to as output audio signal(s) without departing from the disclosure, and one of skill in the art will recognize that audio data output by the AEC component 120 may also be referred to as an error audio data m(t), error signal m(t) and/or the like.

Figure 2B:
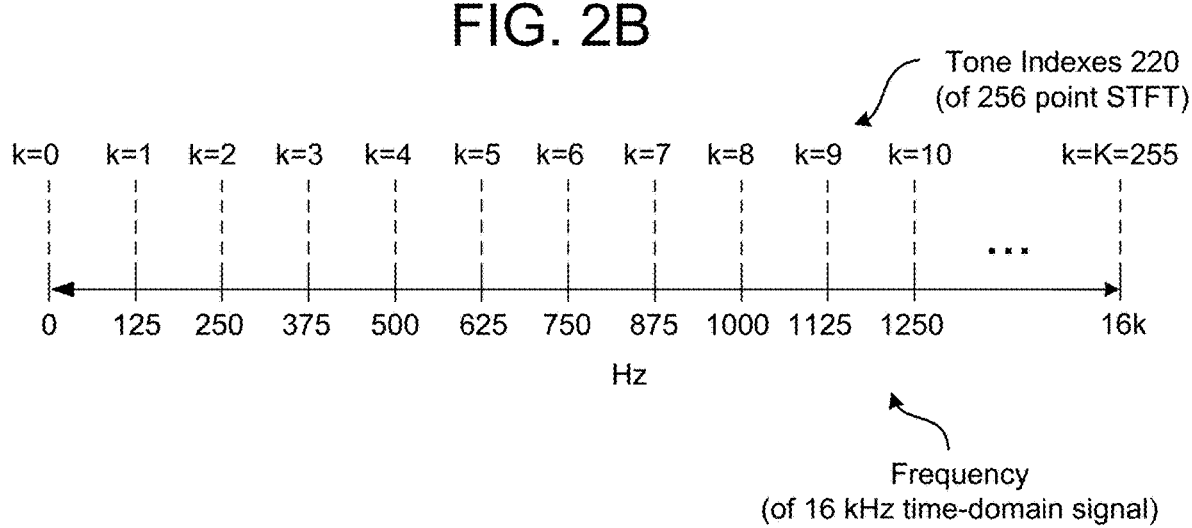
Figure 2C:
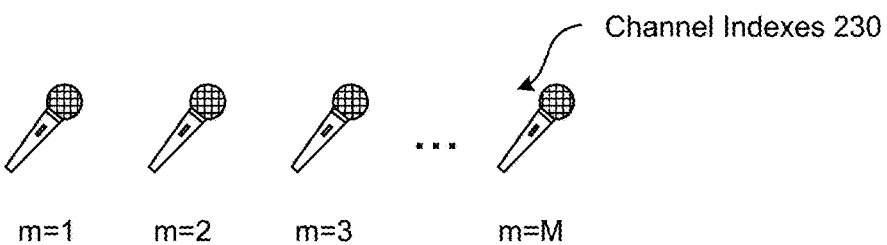

FIGS. 2A-2C illustrate examples of frame indexes, tone indexes, and channel indexes. As described above, the device 110 may generate microphone audio data $x_m(t)$ using microphone(s) 112. For example, a first microphone 112a may generate first microphone audio data $x_{m1}(t)$ in a time domain, a second microphone 112b may generate second microphone audio data $x_{m2}(t)$ in the time domain, and so on. As illustrated in FIG. 2A, a time domain signal may be represented as microphone audio data x(t) 210, which is comprised of a sequence of individual samples of audio data. Thus, x(t) denotes an individual sample that is associated with a time t.

While the microphone audio data x(t) 210 is comprised of a plurality of samples, in some examples the device 110 may group a plurality of samples and process them together. As illustrated in FIG. 2A, the device 110 may group a number of samples together in a frame to generate microphone audio data x(n) 212. As used herein, a variable x(n) corresponds to the time-domain signal and identifies an individual frame (e.g., fixed number of samples s) associated with a frame index n.

Additionally or alternatively, the device 110 may convert microphone audio data x(n) 212 from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data X(n, k) 214 in the frequency domain or the subband domain. As used herein, a variable X(n, k) corresponds to the frequency-domain signal and identifies an individual frame associated with frame index n and tone index k. As illustrated in FIG. 2A, the microphone audio data x(t) 212 corresponds to time indexes 216, whereas the microphone audio data x(n) 212 and the microphone audio data X(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data x(t) 210) and frame indexes 218 (e.g., microphone audio data x(n) 212 in the time domain and microphone audio data X(n, k) 216 in the frequency domain). For example, the system 100 may apply FFT processing to the time-domain microphone audio data x(n) 212, producing the frequency-domain microphone audio data X(n,k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different subbands (e.g., tone indexes), the disclosure is not limited thereto and the system 100 may divide the frequency range into K different subbands (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

The system 100 may include multiple microphone(s) 112, with a first channel m corresponding to a first microphone 112a, a second channel (m+1) corresponding to a second microphone 112b, and so on until a final channel (MP) that corresponds to microphone 112M. FIG. 2C illustrates channel indexes 230 including a plurality of channels from channel m1 to channel M. While many drawings illustrate two channels (e.g., two microphones 112), the disclosure is not limited thereto and the number of channels may vary. For the purposes of discussion, an example of system 100 includes "M" microphones 112 (M>1) for hands free near-end/far-end distant speech recognition applications.

While FIGS. 2A-2C are described with reference to the microphone audio data $x_m(t)$, the disclosure is not limited thereto and the same techniques apply to the playback audio data $x_r(t)$ without departing from the disclosure. Thus, playback audio data $x_r(t)$ indicates a specific time index t from a series of samples in the time-domain, playback audio data $x_r(n)$ indicates a specific frame index n from series of frames in the time-domain, and playback audio data $X_r(n, k)$ indicates a specific frame index n and frequency index k from a series of frames in the frequency-domain.

Prior to converting the microphone audio data $x_m(n)$ and the playback audio data $x_r(n)$ to the frequency-domain, the device 110 must first perform time-alignment to align the playback audio data $x_r(n)$ with the microphone audio data $x_m(n)$. For example, due to nonlinearities and variable delays associated with sending the playback audio data $x_r(n)$ to the loudspeaker(s) 114 using a wireless connection, the playback audio data $x_r(n)$ is not synchronized with the microphone audio data $x_m(n)$. This lack of synchronization may be due to a propagation delay (e.g., fixed time delay) between the playback audio data $x_r(n)$ and the microphone audio data $x_m(n)$, clock jitter and/or clock skew (e.g., difference in sampling frequencies between the device 110 and the loudspeaker(s) 114), dropped packets (e.g., missing samples), and/or other variable delays.

To perform the time alignment, the device 110 may adjust the playback audio data $x_r(n)$ to match the microphone audio data $x_m(n)$. For example, the device 110 may adjust an offset between the playback audio data $x_r(n)$ and the microphone audio data $x_m(n)$ (e.g., adjust for propagation delay), may add/subtract samples and/or frames from the playback audio data $x_r(n)$ (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data.

Figure 3:
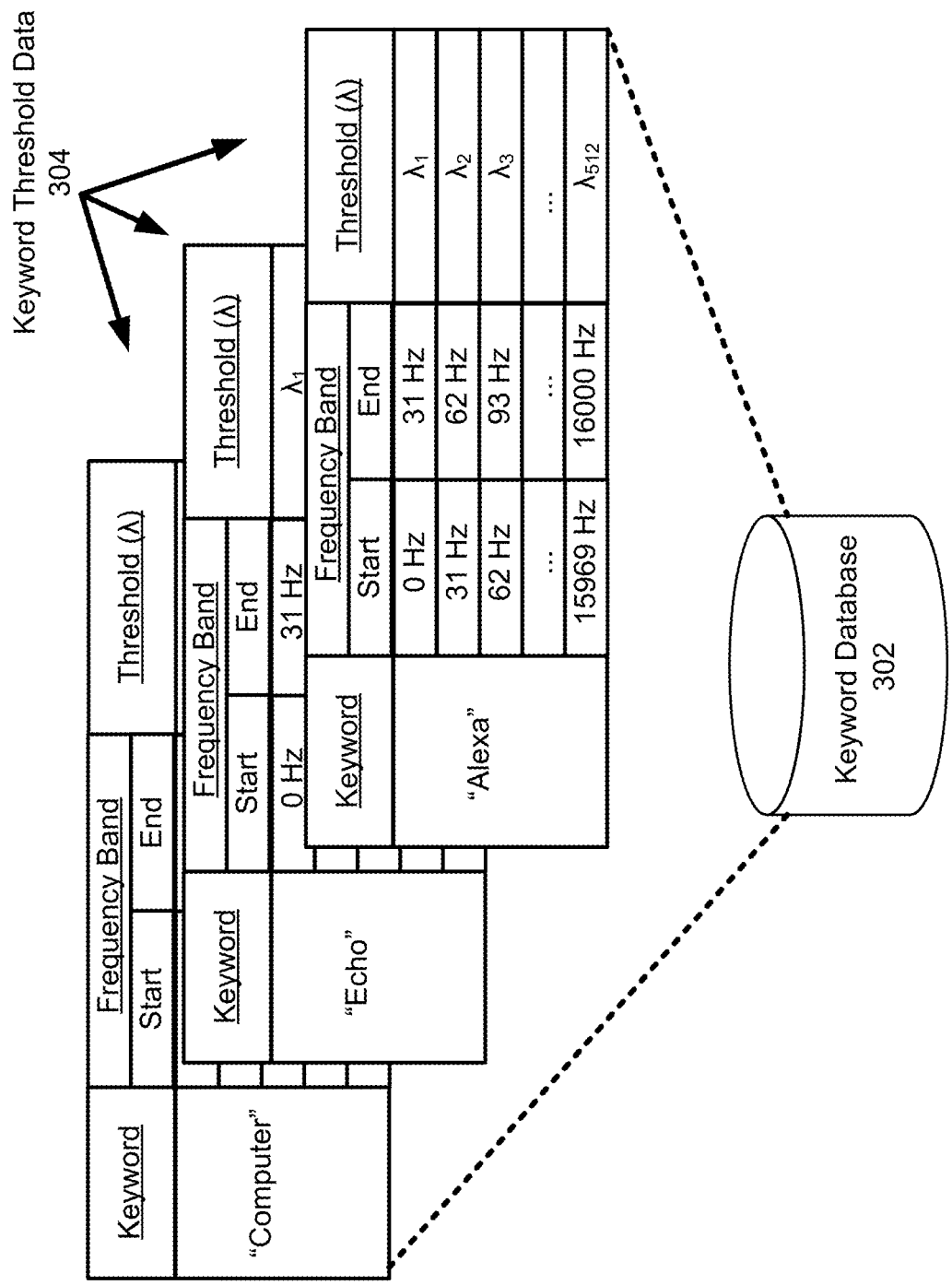
FIG. 3 illustrates an example of keyword threshold data according to embodiments of the present disclosure.

FIG. 3 illustrates an example of keyword threshold data according to embodiments of the present disclosure. As described above with regard to FIG. 1, the system 100 may be configured to selectively rectify (e.g., attenuate) a portion of the error signal m(t) based on energy statistics corresponding to a keyword (e.g., wakeword or target speech). To detect a specific keyword (e.g., wakeword such as "Alexa," "Echo," Computer," etc.), the system 100 may acquire training data corresponding to the keyword, study spectral components of the training data and model a spectral fingerprint associated with the keyword. For example, the training data may correspond to a number of keyword utterances from diverse speakers recorded in noise-free environment. Based on the training data, the system 100 may determine an empirical cumulative density function of the energy at each frequency band (e.g., subband) over the entire utterance. The system 100 may perform this keyword modeling and output a threshold $\lambda(f)$ of the β-percentile point of the energy at frequency f at the center of each frequency band, as described above with regard to Equation [1].

FIG. 3 illustrates an example of keyword threshold data 304 stored in a keyword database 302. The keyword database 302 may be local to the device 110 and/or stored on a remote device or remote system (not illustrated) included in the system 100. As illustrated in FIG. 3, the keyword database 302 may include keyword threshold data 304 for three unique keywords (e.g., "Alexa," "Echo," and "Computer"). However, this is intended to conceptually illustrate an example and the disclosure is not limited thereto. Instead, the keyword database 302 may include keyword threshold data 304 associated with any number of unique keywords without departing from the disclosure. For example, the remote system may include a first keyword database 302a that includes a plurality of unique keywords, a first device 110a may include a second keyword database 302b that includes only one unique keyword, and a second device 110b may include a third keyword database 302c that includes three unique keywords without departing from the disclosure.

As illustrated in FIG. 3, the keyword threshold data 304 for a single keyword may indicate the keyword (e.g., "Alexa") and may include a unique threshold $\lambda(f)$ representing an expected energy value for each frequency band. For example, FIG. 3 illustrates a first frequency band (e.g., 0-31 Hz) associated with a first threshold value $\lambda_1$, a second frequency band (e.g., 31-62 Hz) associated with a second threshold value $\lambda_2$, a third frequency band (e.g., 62-93 Hz) associated with a third threshold value $\lambda_3$, and so on until a final frequency band (e.g., 15969-16000 Hz) associated with a final threshold value $\lambda_{512}$. Thus, each individual frequency band is associated with an expected energy value that is unique to the keyword.

While FIG. 3 illustrates an example of 512 different frequency bands, the disclosure is not limited thereto and the number of frequency bands may vary without departing from the disclosure. Additionally or alternatively, while FIG. 3 illustrates uniform frequency bands starting at 0 Hz and continuing to a maximum frequency of 16 kHz, the disclosure is not limited thereto and a size of the frequency bands, the starting frequency, and/or the maximum frequency may vary without departing from the disclosure.

Figure 4:
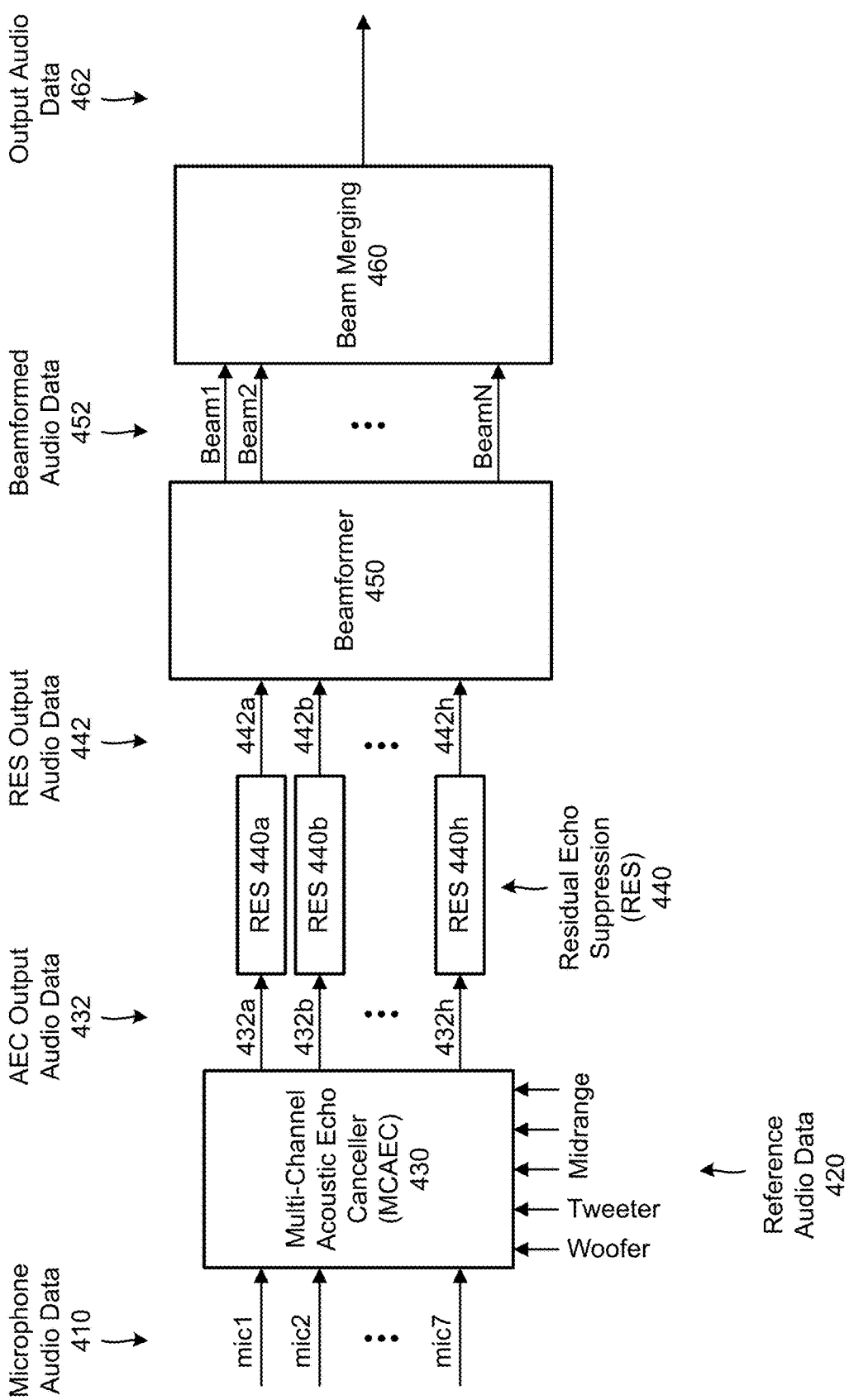
FIG. 4 illustrates an example component diagram according to embodiments of the present disclosure.

FIG. 4 illustrates an example component diagram according to embodiments of the present disclosure. As illustrated in FIG. 4, a multi-channel acoustic echo canceller (MCAEC) component 430 may receive microphone audio data 410 from the microphone(s) 112 (e.g., microphone audio data $x_m(t)$) and reference audio data 420 (e.g., playback audio data $x_r(t)$). For example, the microphone audio data 410 may include an individual channel for each microphone, such as a first channel mic1 associated with a first microphone 112a, a second channel mic2 associated with a second microphone 112b, and so on until a seventh channel mic7 associated with a seventh microphone 112g. While FIG. 4 illustrates 7 unique microphones 112, the disclosure is not limited thereto and the number of microphones 112 may vary without departing from the disclosure.

Similarly, the reference audio data 420 may include five separate channels, such as a first channel corresponding to a first loudspeaker 114a (e.g., woofer), a second channel corresponding to a second loudspeaker 114b (e.g., tweeter), and three additional channels corresponding to three additional loudspeakers 114c-114e (e.g., midrange). While FIG. 4 illustrates the reference audio data 420 including five channels (e.g., five unique loudspeakers 114), the disclosure is not limited thereto and the number of loudspeakers may vary without departing from the disclosure.

The MCAEC component 430 may perform echo cancellation by subtracting the reference audio data 420 from the microphone audio data 410 to generate AEC output audio data 432. For example, the MCAEC component 430 may generate a first channel of AEC output audio data 432a corresponding to the first microphone 112a, a second channel of AEC output audio data 432b corresponding to the second microphone 112b, and so on. Thus, the device 110 may process the individual channels separately.

The device 110 may include residual echo suppression (RES) components 440, with a separate RES component 440 for each microphone 112, which may generate RES output audio data 442. For example, a first RES component 440a may generate a first channel of RES output audio data 442a corresponding to the first microphone 112a, a second RES component 440b may generate a second channel of RES output audio data 442b corresponding to the second microphone 112b, and so on.

The device 110 may include a beamformer component 450 that may receive the RES output audio data 442 and perform beamforming to generate beamforming audio data 452. For example, the beamformer component 450 may generate directional audio data corresponding to N unique directions (e.g., N unique beams). The number of unique directions may vary without departing from the disclosure, and may be similar or different from the number of microphones 112.

A beam merging component 460 may receive the beamformed audio data 452 and generate output audio data 462. For example, the beam merging component 460 may select directional audio data associated with a single direction from the beamformed audio data 452 and/or may generate a weighted sum that combines portions of the beamformed audio data 452 associated with two or more directions.

While FIG. 4 illustrates the device 110 processing each of the microphone channels independently (e.g., using a separate RES component 440), the disclosure is not limited thereto. In some examples, the device 110 may process multiple microphone channels using a single RES component 440 without departing from the disclosure. Additionally or alternatively, the device 110 may combine the multiple microphone channels into a single output, such that the AEC output audio data 432 corresponds to a single channel and is processed by a single RES component 440.

While FIG. 4 illustrates the beamformer component 450 processing the RES output audio data 442, the disclosure is not limited thereto and in some examples the beamformer component 450 may process the microphone audio data 410 without departing from the disclosure. For example, the beamformer component 450 may process the microphone audio data 410 to generate beamformed audio data that is input to the MCAEC component 430. In some examples, the MCAEC component 430 may select a portion of the beamformed audio data as a target signal and a second portion of the beamformed audio data as a reference signal and perform echo cancellation by subtracting the reference signal from the target signal to generate a single output signal. However, the disclosure is not limited thereto and the MCAEC component 430 may perform echo cancellation individually for directional data associated with each direction without departing from the disclosure. For example, the MCAEC component 430 may generate up to N separate output signals without departing from the disclosure.

Figure 5:
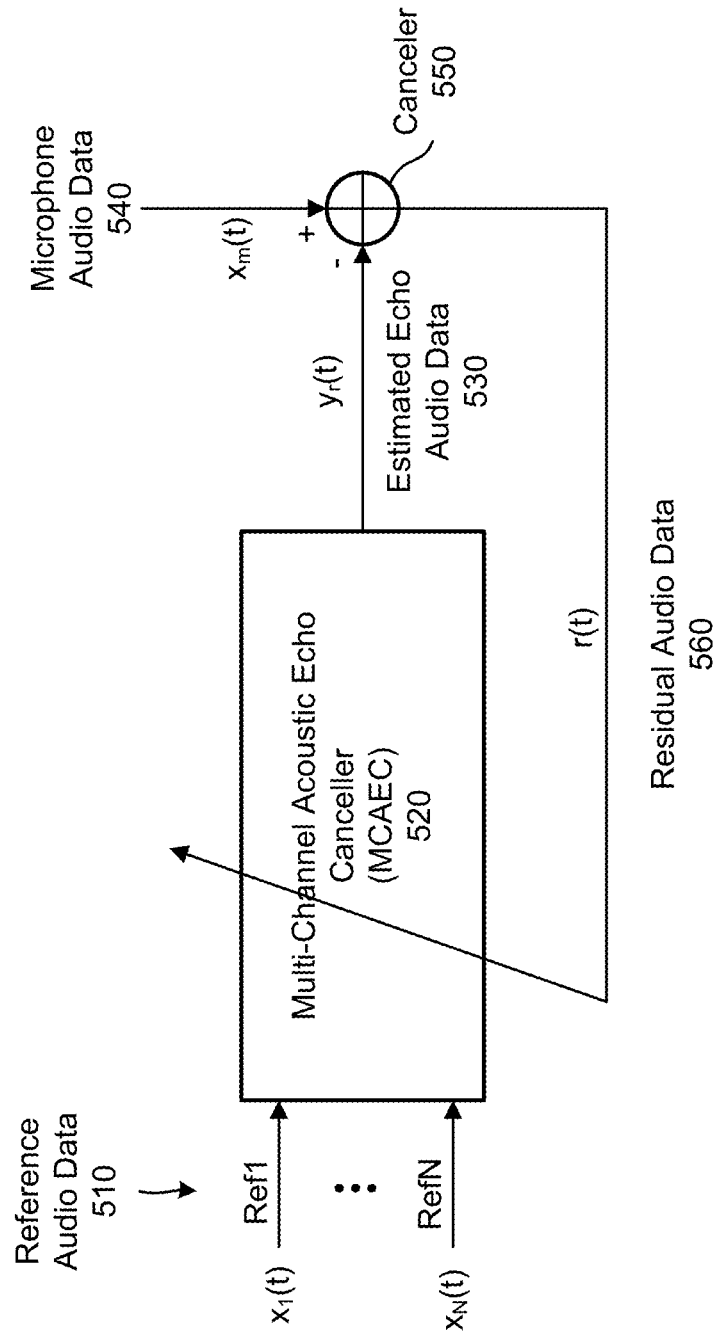
FIG. 5 illustrates an example of performing echo cancellation according to embodiments of the present disclosure.

FIG. 5 illustrates an example of performing echo cancellation according to embodiments of the present disclosure. As illustrated in FIG. 5, an MCAEC component 520 may receive reference audio data $x_r(t)$ 510 comprising N different reference signals (e.g., first reference Ref1 $x_1(t)$, second reference Ref2 $x_2(t)$, and so on until N-th reference RefN $x_N(t)$) and may generate estimated echo audio data $y_r(t)$ 530 corresponding to an estimate of the echo signal y(t) received by the microphone 112.

An individual microphone 112 may generate microphone audio data $x_m(t)$ 540 and a canceler component 550 may subtract the estimated echo audio data $y_r(t)$ 530 from the microphone audio data $x_m(t)$ 540 to generate residual audio data r(t) 560. Thus, the device 110 may perform echo cancellation to remove the estimated echo from the microphone audio data 540 and generate the residual audio data r(t) 560. While FIG. 5 illustrates the canceler component 550 separate from the MCAEC component 520, the disclosure is not limited thereto and the MCAEC component 520 may include the canceler component 550 without departing from the disclosure.

FIG. 6 illustrates examples of signal quality metrics according to embodiments of the present disclosure. As described above with regard to FIG. 1, an expected energy value 610 may correspond to a threshold $\lambda(f)$ determined using Equation [1]. The expected energy values for individual frequency bands may be calculated offline for a unique keyword. Thus, the device 110 may store a plurality of expected energy values 610 for individual keywords and use the plurality of expected energy values 610 at runtime to select individual frequency bands.

To select a frequency band on which to perform RES, the device 110 may calculate signal quality metric values and identify a fixed number frequency bands having lowest signal quality metric values. As illustrated in FIG. 6, the device 110 may determine an Echo Return Loss Enhancement (ERLE) value 620, a residual music value 630, and a signal-to-echo ratio (SER) value 640, although the disclosure is not limited thereto.

The device 110 may determine the ERLE value 620 for each microphone and each frequency band over a long time window (e.g., first duration of time corresponding to 4-5 seconds). For example, the device 110 may determine a ratio between the energy of the echo signal y(t) (e.g., estimated echo audio data 530) and the residual energy after the MCAEC component 520 (e.g., residual audio data 560):

$$ELRE^{(t)}(f) = \mathbb{E}\{\|Y^{(t)}(f)\|^2 - \|R^{(t)}(f)\|^2\} \qquad [2]$$

where $ELRE^{(t)}(f)$ denotes the ERLE value 620, $\mathbb{E}$ denotes the expectation operator computed using slow averaging, $\|R^{(t)}(f)\|^2$ is the energy of the residual music at time frame t, and $\|Y^{(t)}(f)\|^2$ is the energy of the instantaneous energy of the echo signal at the frequency band during time frame t. Note that the existence of speech is assumed to be a sparse event and therefore its impact on long term ERLE estimate is ignored. As illustrated in Equation [2] and in FIG. 6, the system 100 may determine the ERLE value 620 based on a ratio between the echo signal y(t) (e.g., $Y^{(t)}(f)$) and the residual signal r(t) (e.g., $R^{(t)}(f)$). However, the disclosure is not limited thereto and the system 100 may determine the ERLE value 620 using any technique known to one of skill in the art without departing from the disclosure. For example, the system 100 may estimate the ERLE value using the microphone signal (e.g., microphone audio data 540) and the reference signal (e.g., reference audio data 510) without departing from the disclosure.

The device 110 may determine an instantaneous residual music value 630 at each frequency band (expressed in decibels (dB)) for each microphone and each frequency band over a short time window (e.g., second duration of time corresponding to milliseconds):

$$E^{(t)}(f) = \|Y^{(t)}(f)\|^2 - ELRE^{(t)}(f) \qquad [3]$$

where $E^{(t)}(f)$ denotes the residual music value 630, $\|Y^{(t)}(f)\|^2$ denotes the instantaneous energy of the echo signal at the frequency band during time frame t, and $ELRE^{(t)}(f)$ denotes the ERLE value 620.

The device 110 may determine the SER value 640 (in dB) for each frequency band as:

$$\Psi(t,f) = \lambda(f) - E^{(t)}(f) \qquad [4]$$

where $\Psi(t, f)$ denotes the SER value 640 for the frequency band f during the time frame t, $\lambda(f)$ denotes the expected energy value 610 for the frequency band f and $E^{(t)}(f)$ denotes the residual music value 630 for the frequency band f during time frame t. While FIG. 6 and Equation [4] illustrate an example of determining SER values 640 for individual frequency bands, a global SER value (e.g., SER value across all frequency bands) may be determined using any technique known to one of skill in the art. For example, the system 100 may determine the global SER value based on a ratio between the residual signal r(t) and the echo signal y(t).

The device 110 may identify SER values 640 below a threshold γ, as shown in threshold comparison 650:

$$\Psi(t,f) < \gamma \quad [5]$$

where $\Psi(t, f)$ denotes the SER value 640 and $\gamma$ denotes a threshold value (e.g., 0 dB) that may be used to identify weak SER values 640.

For frequency bands that are not selected, the device 110 may determine a pass-through output 660:

$$r_{out}(t,f) = r(t,f) \quad [6]$$

where $r_{out}(t, f)$ denotes an output of the RES component 122 and $r(t, f)$ denotes an input to the RES component 122.

For frequency bands that are selected, the RES component 122 may rectify the selected frequency bands and generate a suppressed output 670 using two different techniques. In some examples, the RES component 122 may generate a filtered output 672:

$$r_{out}(t, f) = \frac{\Psi(t, f)}{\Psi(t, f) + 1} r(t, f) \quad [7]$$

where $r_{out}(t, f)$ denotes an output of the RES component 122 and $r(t, f)$ denotes an input to the RES component 122, and $\Psi(t, f)$ denotes the SER value 640 for the frequency band f. In other examples, the RES component 122 may generate a binary output 674:

$$r_{out}(t,f) = 0 \quad [8]$$

Figure 7:
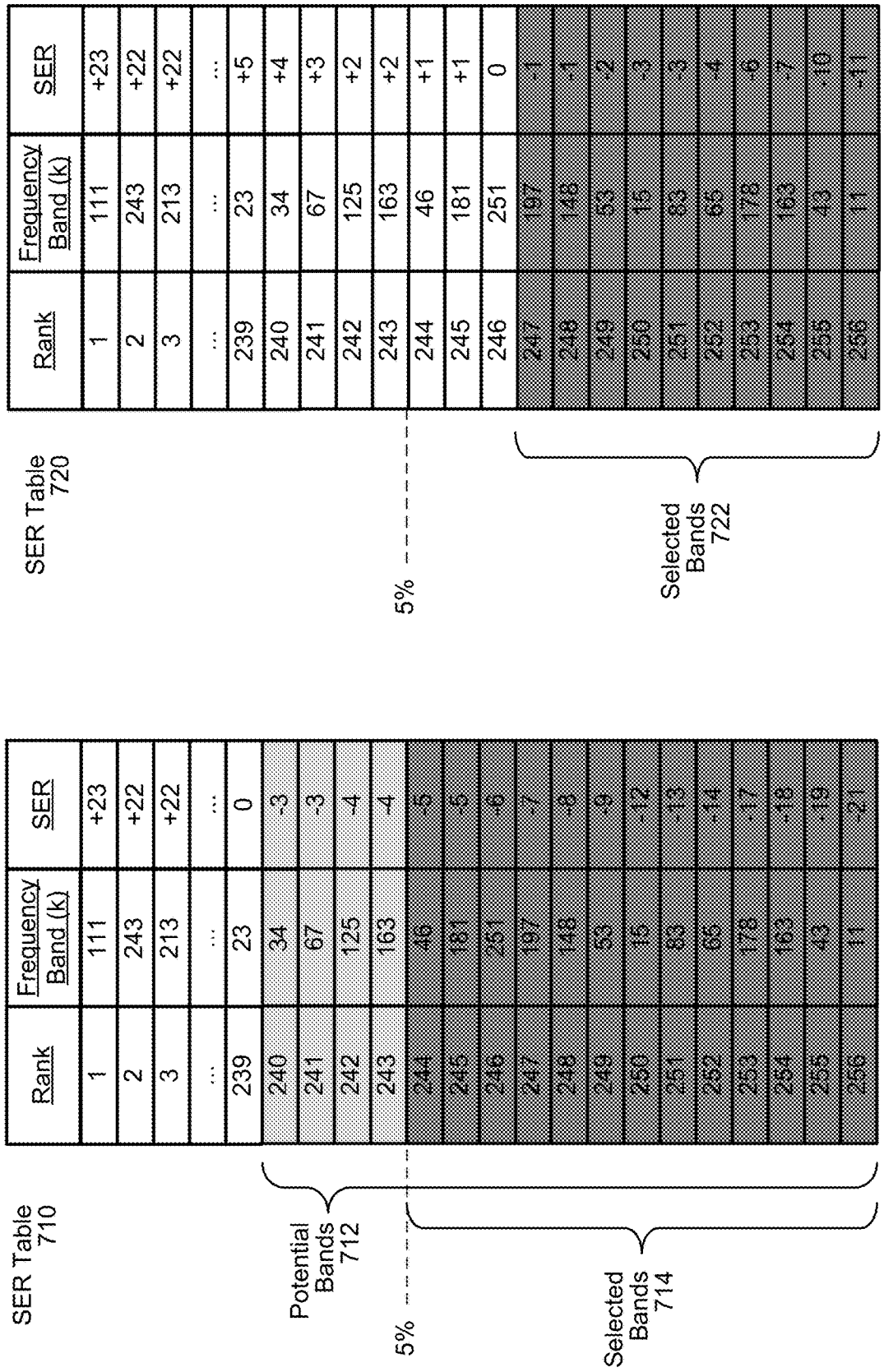
FIG. 7 illustrates examples of selecting time-frequency units on which to perform residual echo suppression according to embodiments of the present disclosure.

FIG. 7 illustrates examples of selecting time-frequency units on which to perform residual echo suppression according to embodiments of the present disclosure. As described above with regard to FIG. 6, the device 110 may determine SER values 640 for each frequency band. To select a fixed number of frequency bands, the device 110 may identify SER values 640 below a threshold $\gamma$, as described above with regard to Equation [5]. For example, FIG. 7 illustrates the threshold $\gamma$ being 0 dB.

As illustrated in FIG. 7, a first SER table 710 includes 17 different frequency bands having SER values below the threshold $\gamma$ (e.g., 0 dB), indicated as potential bands 712. However, the device 110 only selects up to 5% of the frequency bands, which in this example corresponds to 13 frequency bands out of 256 total frequency bands. Thus, the device 110 only selects the 13 frequency bands having the lowest SER values, indicated as selected bands 714.

In contrast, a second SER table 720 includes only 10 frequency bands having SER values below the threshold $\gamma$ (e.g., 0 dB). Thus, instead of selecting the 13 lowest SER values, the device 110 only selects the 10 frequency bands having SER values below the threshold $\gamma$, indicated as selected bands 722.

While FIG. 7 illustrates examples that include 256 total frequency bands, selecting up to 5% of the frequency bands (e.g., 13 frequency bands), and a threshold $\gamma$ of 0 dB, the disclosure is not limited thereto. Instead, the total number of frequency bands, the maximum percentage of selected frequency bands, and/or the threshold $\gamma$ may vary without departing from the disclosure.

Figure 8:
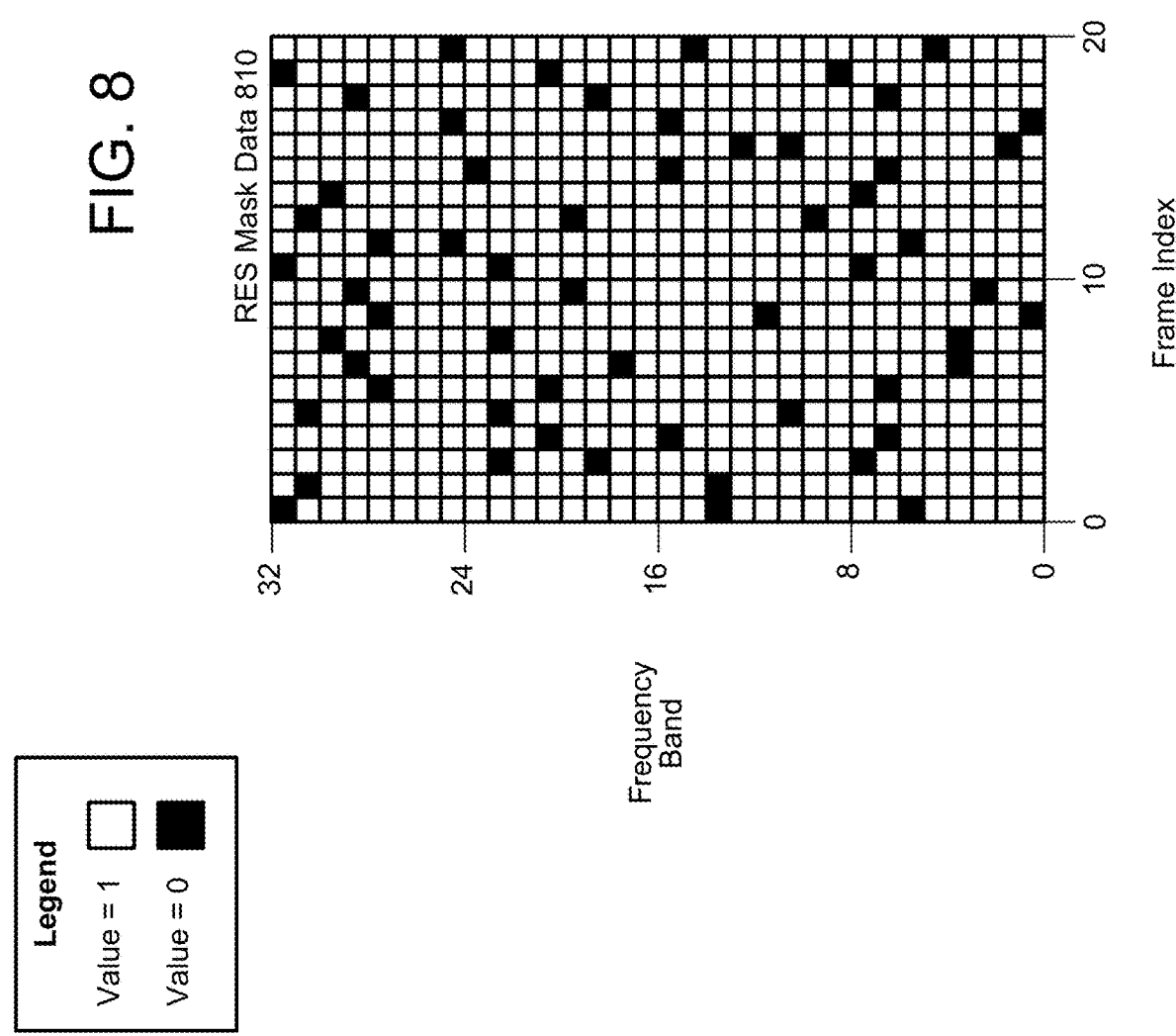
FIG. 8 illustrates an example of a binary mask according to embodiments of the present disclosure.

FIG. 8 illustrates an example of a binary mask according to embodiments of the present disclosure. As illustrated in FIG. 8, the device 110 may generate RES mask data 810 (e.g., binary mask) indicating first frequency bands that are selected for residual echo suppression processing. For example, the RES mask data 810 indicates the first frequency bands with a value of 0 (e.g., black) indicating that the RES component 122 will attenuate or completely remove the frequency band when generating the output audio data r(t). Remaining second frequency bands that are not selected by the RES component 122 are represented with a value of 1 (e.g., white) indicating that the RES component 122 will pass the second frequency bands when generating the output audio data r(t).

The RES mask data 810 indicates frequency bands along the vertical axis and frame indexes along the horizontal axis. For ease of illustration, the RES mask data 810 includes only a few frequency bands (e.g., 32). However, the device 110 may determine mask values for any number of frequency bands without departing from the disclosure. For example, the device 110 may generate the RES mask data 810 corresponding to 512 frequency bands, although the number of frequency bands may vary without departing from the disclosure.

For ease of illustration, FIG. 8 illustrates an example in which only three frequency bands are selected for RES processing for each frame index, which corresponds to 10% of the 32 total frequency bands. However, this example is intended for illustrative purposes only and the disclosure is not limited thereto. Instead, selection table 820 illustrates additional examples corresponding to 5% and 10% threshold values for varying number of frequency bands.

As illustrated in the selection table 820, the device 110 may select either 2 (5%) or 3 (10%) frequency bands when there are 32 total frequency bands, 6 (5%) or 13 (10%) frequency bands when there are 128 total frequency bands, 13 (5%) or 26 (10%) frequency bands when there are 256 total frequency bands, and 26 (5%) or 51 (10%) frequency bands when there are 512 total frequency bands. However, the disclosure is not limited thereto and the maximum percentage and/or the total number of frequency bands may vary without departing from the disclosure.

While the examples described above illustrate the fixed number as a percentage of the total number of frequency bands, the disclosure is not limited thereto and the fixed number may be a predetermined value and/or may vary without departing from the disclosure. Additionally or alternatively, while the examples described above illustrate the fixed number being constant over time, the disclosure is not limited thereto and the maximum number of frequency bands to select may vary depending on system conditions. For example, the system 100 may determine a global SER value (e.g., SER value across all frequency bands) and determine the maximum number of frequency bands based on the global SER value. In some examples, the maximum number is inversely proportional to the global SER value, such that the maximum number may be lower (e.g., 26 or 5%) when the global SER value is relatively low and may be higher (e.g., 51 or 10%) when the global SER value is relatively high.

In some examples, the RES mask data 810 corresponds to binary values and the device 110 may generate the output audio data r(t) (e.g., output of the RES component 122) by multiplying the error signal m(t) (e.g., input to the RES component 122) by the RES mask data 810. For example, the device 110 may pass the second frequency bands in the error signal m(t) (e.g., apply a gain value of 1) using Equation [6], while suppressing the first frequency bands in the error signal m(t) (e.g., attenuating by applying a gain value of 0) using Equation [8]. Thus, the output audio data r(t) generated by the RES component 122 only includes the time-frequency bands that were not selected as having lowest SER values.

The disclosure is not limited thereto, however, and in other examples the RES component 122 may perform RES processing by filtering the input instead of completely suppressing the selected frequency bands. For example, the RES component 122 may pass the second frequency bands in the error signal m(t) (e.g., apply a gain value of 1) using Equation [6], while attenuating the first frequency bands in the error signal m(t) based on the SER value, such as by applying a gain value calculated using Equation [7]. Thus, the output audio data r(t) generated using Equation [6] includes a portion of every time-frequency band in the error signal m(t), with larger gain values (e.g., less attenuation) applied to time-frequency bands in the error signal m(t) having higher SER values and smaller gain values (e.g., more attenuation) applied to time-frequency bands in the error signal m(t) having lowest SER values.

In some examples, the RES component 122 may perform RES processing using a combination of Equations [7]-[8]. For example, the RES component 122 may apply Equation [8] to frequency bands having SER values below a second threshold value (e.g., −10 dB) and apply Equation [7] to frequency bands having SER values above the second threshold value. Thus, the lowest SER values result in complete attenuation, while marginally low SER values result in moderate attenuation. The disclosure is not limited thereto, however, and the amount of filtering and/or the second threshold value may vary without departing from the disclosure.

While FIG. 8 illustrates a binary mask, the disclosure is not limited thereto and the mask data generated by the RES component 122 may correspond to continuous values, with black representing a mask value of zero (e.g., SER values of the selected frequency bands that are below the second threshold value), white representing a mask value of one (e.g., non-selected frequency bands), and varying shades of gray representing intermediate mask values between zero and one (e.g., specific values determined based on the SER values of the selected frequency bands).

Figure 9:
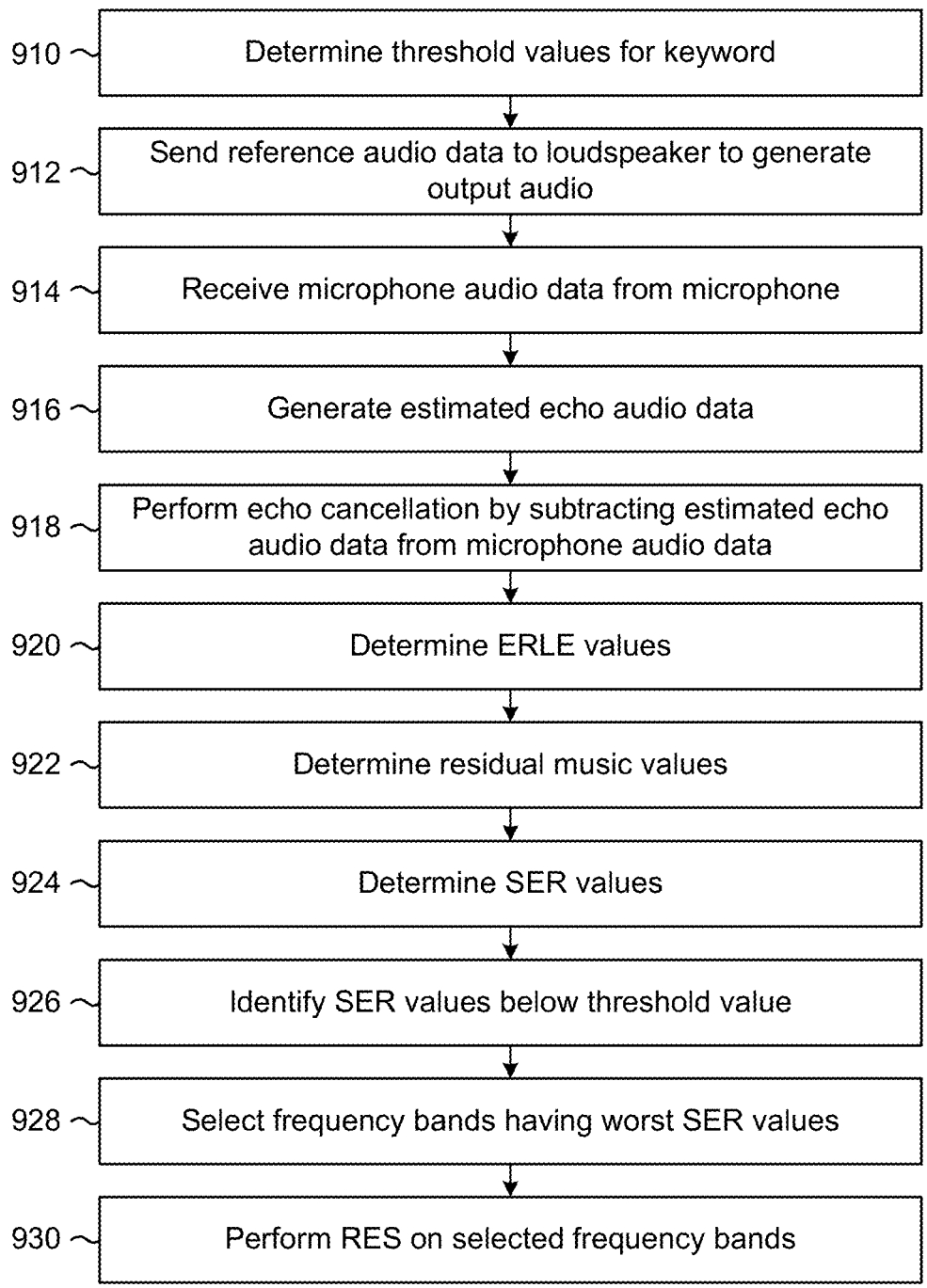
FIG. 9 is a flowchart conceptually illustrating a method for performing residual echo suppression according to embodiments of the present disclosure.

FIG. 9 is a flowchart conceptually illustrating a method for performing residual echo suppression according to embodiments of the present disclosure. As illustrated in FIG. 9, the device 110 may determine (910) threshold values for a keyword. In some examples, the threshold values may be calculated offline and stored in a keyword database, whether locally on the device 110 or on a remote system. Thus, determining the threshold values may correspond to obtaining, receiving, and/or retrieving the pre-calculated threshold values. However, the disclosure is not limited thereto and the device 110 may calculate the threshold values without departing from the disclosure.

The device 110 may send (912) reference audio data to one or more loudspeakers 114 to generate output audio, may receive (914) microphone audio data from one or more microphones 112, may generate (916) estimated echo audio data based on the reference audio data and/or the microphone audio data, and may perform (918) echo cancellation by subtracting the estimated echo audio data from the microphone audio data. In some examples, the device 110 may generate the estimated echo audio data by delaying the reference audio data. However, the disclosure is not limited thereto and in other examples the device 110 may generate the estimated echo audio data based on a portion of the microphone audio data, such as after beamforming the microphone audio data to generate directional data corresponding to a plurality of directions.

The device 110 may determine (920) Echo Return Loss Enhancement (ERLE) values based on a ratio between energy associated with the echo signal and energy associated with the residual signal, determine (922) residual music values based on a ratio of the energy associated with the echo signal and the ERLE values, and determine (924) signal-to-echo ratio (SER) values based on a ratio of the threshold values (e.g., expected energy values corresponding to the keyword) for each frequency band, as described above with regard to Equations [2]-[4]. The device 110 may identify (926) SER values below a threshold value (e.g., 0 dB), select (928) frequency bands having lowest SER values, and perform (930) residual echo suppression (RES) on the selected frequency bands. Determining that the SER values are below the threshold value and/or selecting the lowest SER values may correspond to determining that the SER values satisfy a condition.

For ease of illustration, the disclosure describes specific signal quality metrics including ERLE values, residual music values, and/or SER values. However, the disclosure is not limited thereto and the device 110 may calculate any signal quality metric known to one of skill in the art without departing from the disclosure. For example, the device 110 may determine signal-to-noise ratio values (SNR), signal-to-interference-plus-noise ratio (SINR), and/or the like without departing from the disclosure.

Figure 10:
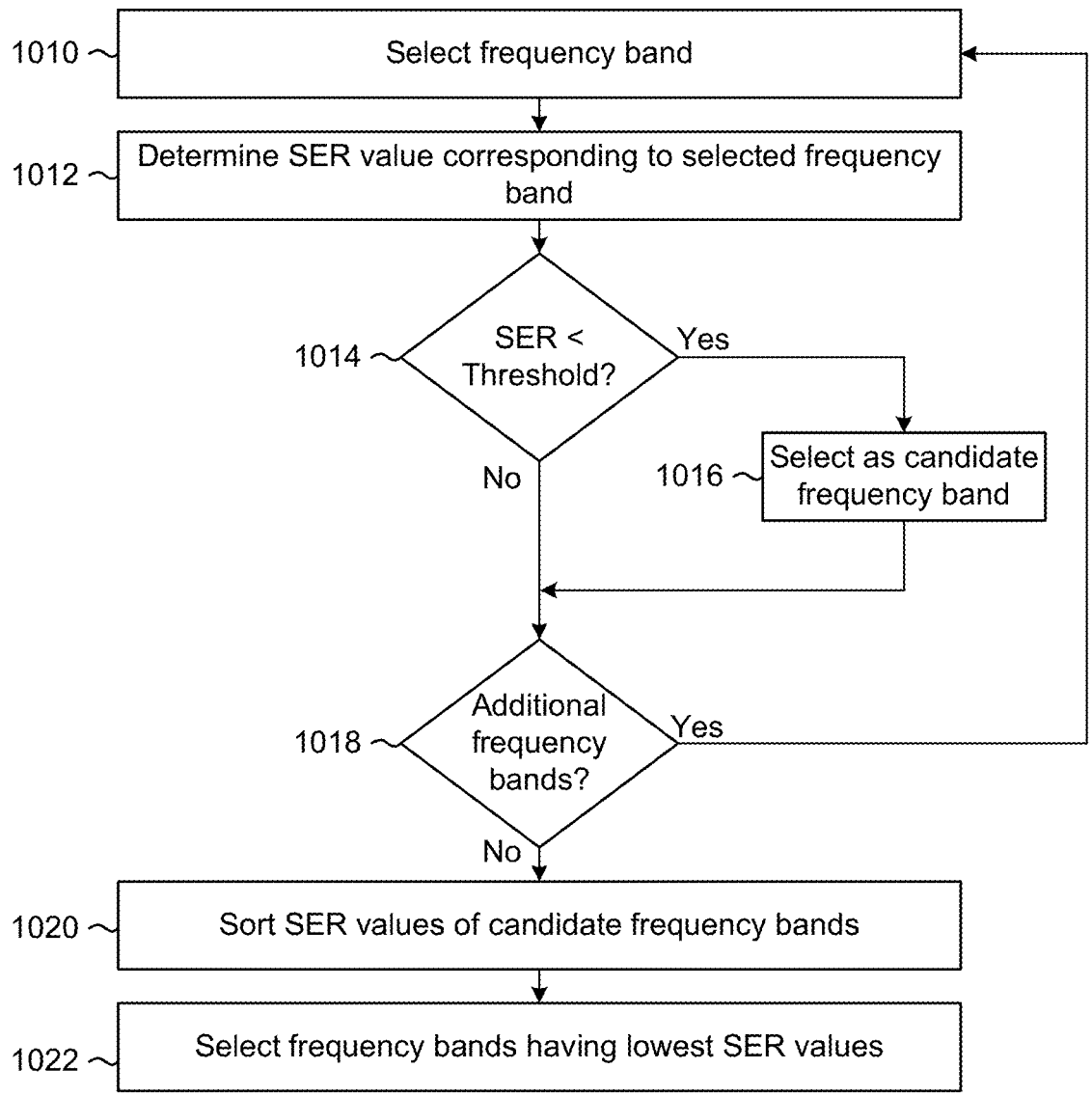
FIG. 10 is a flowchart conceptually illustrating an example method for selecting time-frequency units on which to perform residual echo suppression according to embodiments of the present disclosure.

FIG. 10 is a flowchart conceptually illustrating an example method for selecting time-frequency units on which to perform residual echo suppression according to embodiments of the present disclosure. As illustrated in FIG. 10, the device 110 may select (1010) a frequency band, determine (1012) a SER value corresponding to the selected frequency band, and may determine (1014) whether the SER value is below a threshold value. If the SER value is below the threshold value, the device 110 may select (1016) the frequency band as a candidate frequency band for further consideration. If the SER is above the threshold value, the device 110 may determine (1018) whether there are additional frequency bands and, if so, may loop to step 1010 and select an additional frequency band. If there are no additional frequency bands, the device 110 may sort (1020) the SER values of candidate frequency bands and may select (1022) frequency bands having lowest SER values. For example, the device 110 may select up to a fixed number of frequency bands based on a maximum percentage of the total number of frequency bands, as described in greater detail above.

Figure 11A:
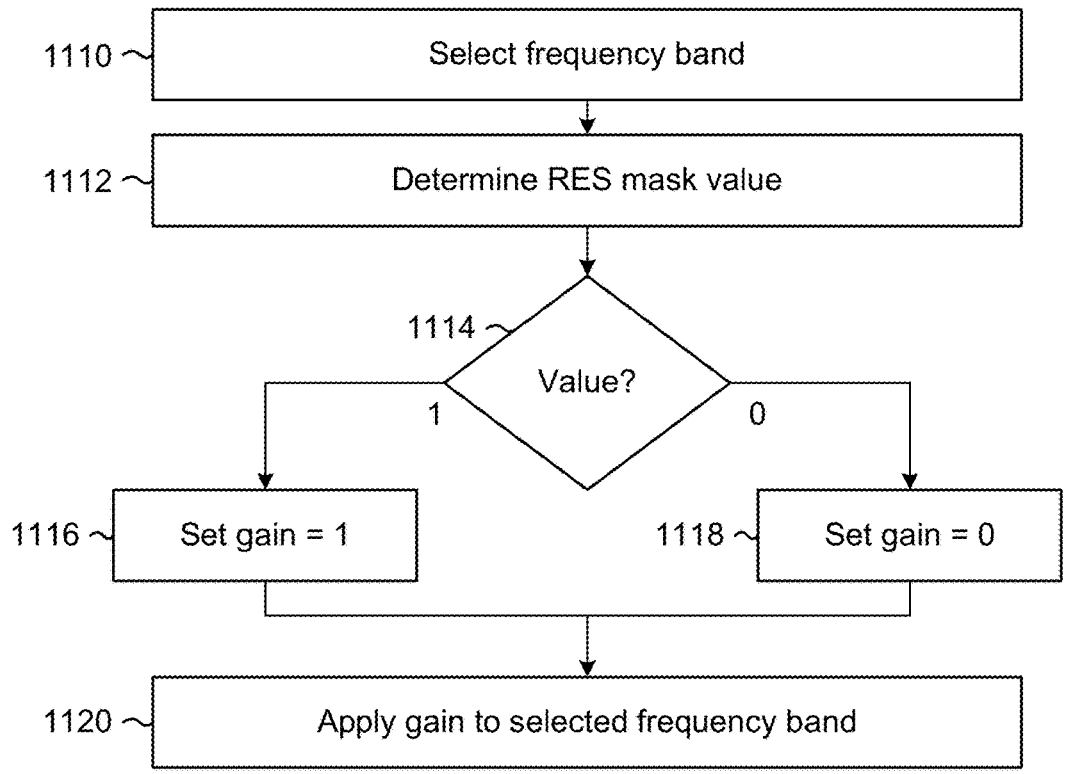
Figure 11B:
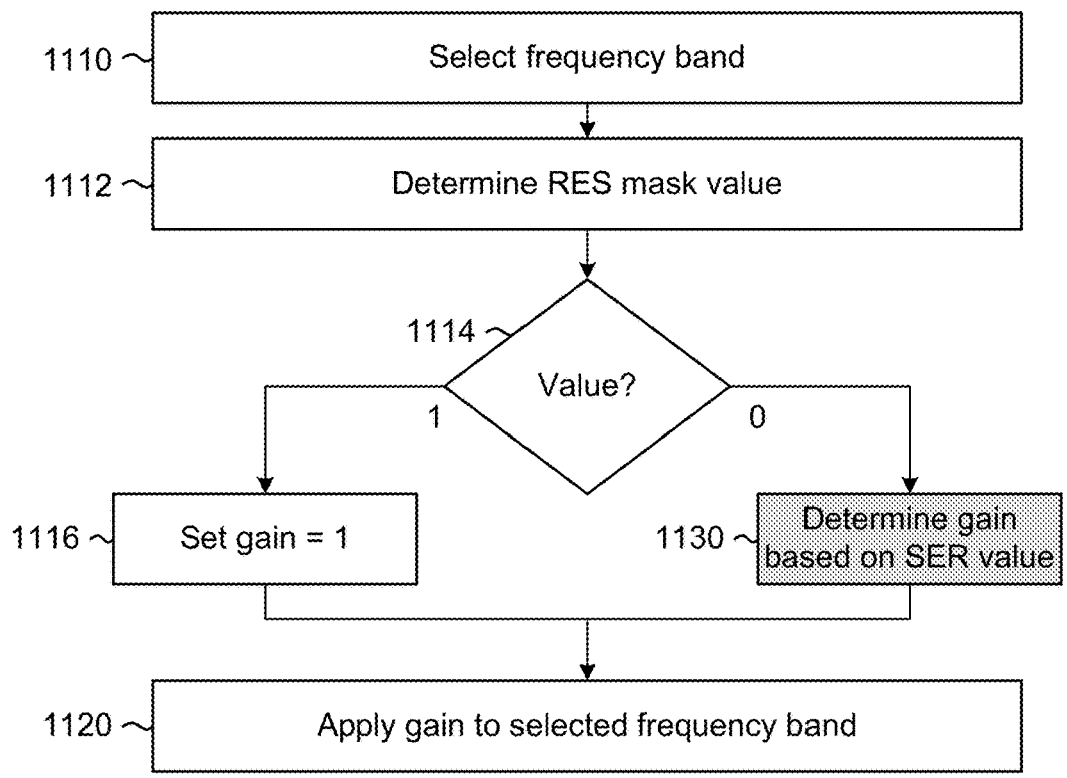

FIGS. 11A-11C are flowcharts conceptually illustrating example methods for performing residual echo suppression according to embodiments of the present disclosure. As illustrated in FIG. 11A, the device 110 may select (1110) a frequency band, determine (1112) a RES mask value corresponding to the selected frequency band, and determine (1114) whether the RES mask value is set to a value of 1 or 0. If the RES mask value is set to a value of 1, the device 110 may determine that the selected frequency band is not selected for RES processing and may set (1116) a gain value equal to a value of 1. However, if the RES mask value is set to a value of 0, the device 110 may determine that the selected frequency band is selected for RES processing and may set (1118) the gain value equal to a value of 0. The device 110 may then apply (1120) the gain value to the selected frequency band during RES processing.

While the example described above refers to the RES mask value being set equal to a value of 0 for the selected frequency bands, the disclosure is not limited thereto. This enables the device 110 to easily perform RES processing by multiplying the RES mask value by an input signal to the RES component 122 to generate an output signal of the RES component 122. However, the device 110 may instead set the RES mask value equal to a value of 1 for the selected frequency bands without departing from the disclosure.

As illustrated in FIG. 11B, in some examples when the device 110 determines that the RES mask value is set to a value of 0, the device 110 may determine (1130) a gain value based on the SER value for the selected frequency band. For example, the device 110 may filter the output using Equation [7] described above.

In some examples, the device 110 may combine the methods of FIGS. 11A-11B. As illustrated in FIG. 11C, when the device 110 determines that the RES mask value is set to a value of 0, the device 110 may determine (1150) the SER value corresponding to the selected frequency band and determine (1152) whether the SER value is above a threshold value. If the SER value is above the threshold value, the device 110 may determine (1154) a gain value based on the SER value. However, if the SER value is below the threshold value, the device 110 may set (1156) the gain value to a value of 0 to completely attenuate the selected frequency band.

Figure 12:
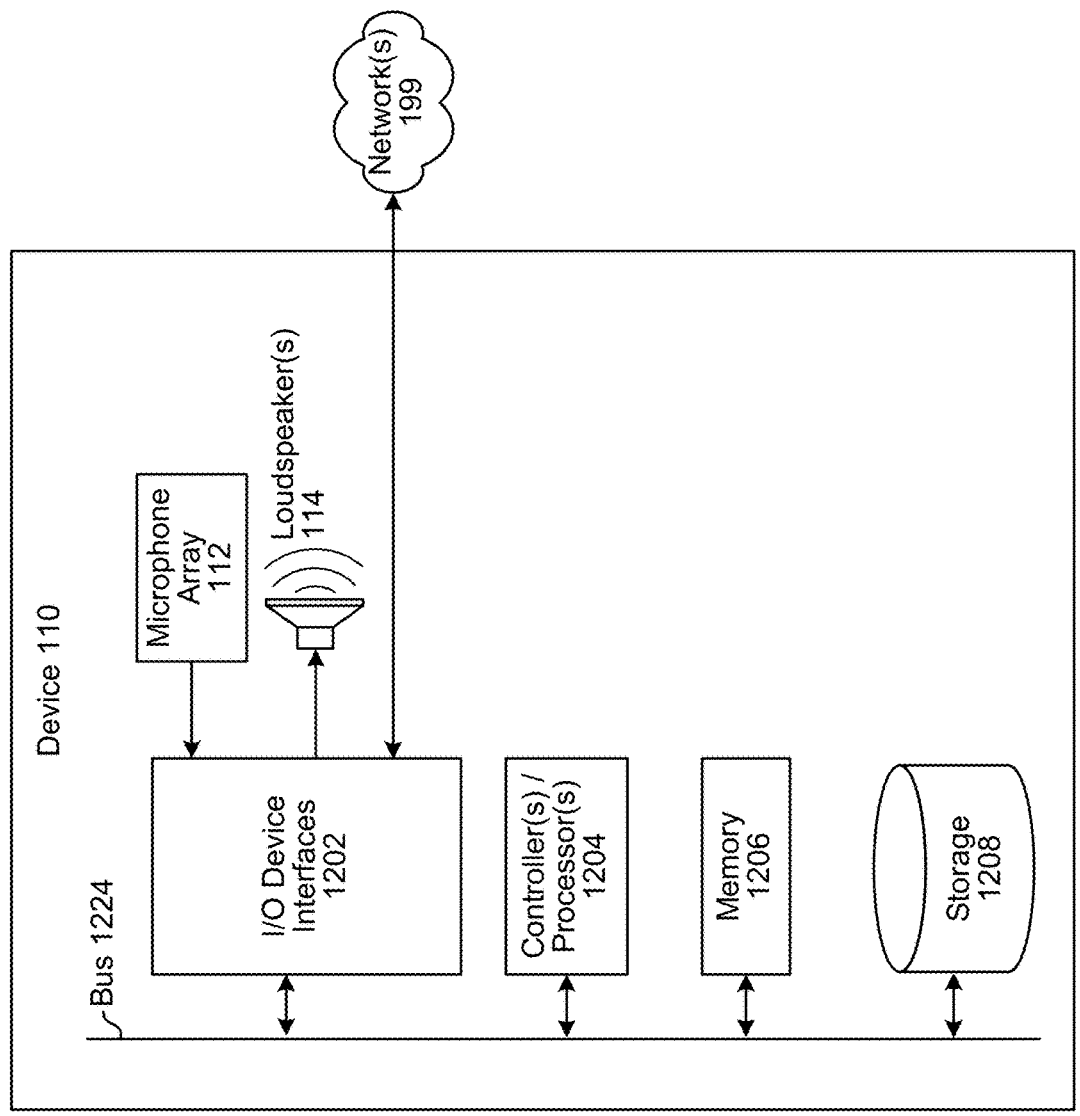
FIG. 12 is a block diagram conceptually illustrating example components of a system according to embodiments of the present disclosure.

FIG. 12 is a block diagram conceptually illustrating example components of a system \ according to embodiments of the present disclosure. In operation, the system 100 may include computer-readable and computer-executable instructions that reside on the device 110, as will be discussed further below.

The device 110 may include one or more audio capture device(s), such as a microphone array which may include one or more microphones 112. The audio capture device(s) may be integrated into a single device or may be separate. The device 110 may also include an audio output device for producing sound, such as loudspeaker(s) 116. The audio output device may be integrated into a single device or may be separate.

As illustrated in FIG. 12, the device 110 may include an address/data bus 1224 for conveying data among components of the device 110. Each component within the device 110 may also be directly connected to other components in addition to (or instead of) being connected to other components across the bus 1224.

The device 110 may include one or more controllers/processors 1204, which may each include a central processing unit (CPU) for processing data and computer-readable instructions, and a memory 1206 for storing data and instructions. The memory 1206 may include volatile random access memory (RAM), non-volatile read only memory (ROM), non-volatile magnetoresistive (MRAM) and/or other types of memory. The device 110 may also include a data storage component 1208, for storing data and controller/processor-executable instructions (e.g., instructions to perform operations discussed herein). The data storage component 1208 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1202.

The device 110 includes input/output device interfaces 1202. A variety of components may be connected through the input/output device interfaces 1202. For example, the device 110 may include one or more microphone(s) 112 (e.g., a plurality of microphone(s) 112 in a microphone array), one or more loudspeaker(s) 114, and/or a media source such as a digital media player (not illustrated) that connect through the input/output device interfaces 1202, although the disclosure is not limited thereto. Instead, the number of microphone(s) 112 and/or the number of loudspeaker(s) 114 may vary without departing from the disclosure. In some examples, the microphone(s) 112 and/or loudspeaker(s) 114 may be external to the device 110, although the disclosure is not limited thereto. The input/output interfaces 1202 may include A/D converters (not illustrated) and/or D/A converters (not illustrated).

The input/output device interfaces 1202 may also include an interface for an external peripheral device connection such as universal serial bus (USB), FireWire, Thunderbolt, Ethernet port or other connection protocol that may connect to network(s) 199.

The input/output device interfaces 1202 may be configured to operate with network(s) 199, for example via an Ethernet port, a wireless local area network (WLAN) (such as WiFi), Bluetooth, ZigBee and/or wireless networks, such as a Long Term Evolution (LTE) network, WiMAX network, 3G network, etc. The network(s) 199 may include a local or private network or may include a wide network such as the internet. Devices may be connected to the network(s) 199 through either wired or wireless connections.

The device 110 may include components that may comprise processor-executable instructions stored in storage 1208 to be executed by controller(s)/processor(s) 1204 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Computer instructions for operating the device 110 and its various components may be executed by the controller(s)/processor(s) 1204, using the memory 1206 as temporary "working" storage at runtime. The computer instructions may be stored in a non-transitory manner in non-volatile memory 1206, storage 1208, or an external device. Alternatively, some or all of the executable instructions may be embedded in hardware or firmware in addition to or instead of software.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the fixed beamformer, acoustic echo canceller (AEC), adaptive noise canceller (ANC) unit, residual echo suppression (RES), double-talk detector, etc. may be implemented by a digital signal processor (DSP).

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving a plurality of threshold values corresponding to a keyword, the plurality of threshold values including a first threshold value and a second threshold value, the first threshold value indicating a first amount of energy representing the keyword in a first frequency band, the second threshold value indicating a second amount of energy representing the keyword in a second frequency band;
   sending first audio data to at least one loudspeaker to generate output audio;
   receiving second audio data generated by at least one microphone, the second audio data including a first representation of the output audio and a first representation of speech generated by a user;
   generating, using the first audio data, third audio data including a second representation of the output audio;
   generating fourth audio data by subtracting the third audio data from the second audio data, the fourth audio data including a second representation of the speech and a third representation of the output audio;
   determining, using the first threshold value, a first signal-to-echo ratio (SER) value for a first portion of the fourth audio data, the first portion of the fourth audio data being within a first frequency band;
   determining, using the second threshold value, a second SER value for a second portion of the fourth audio data, the second portion of the fourth audio data being within a second frequency band;
   determining a plurality of lowest SER values, the plurality of lowest SER values including the first SER value;
   selecting, using the plurality of lowest SER values, a third portion of the fourth audio data, the third portion of the fourth audio data including at least the first frequency band;
   generating fifth audio data by setting the third portion of the fourth audio data equal to a value of zero, the fifth audio data including a third representation of the speech;
   determining that the fifth audio data includes a representation of the keyword; and
   sending the fourth audio data to a remote system for audio processing.

2. The computer-implemented method of claim 1, wherein determining the first SER value further comprises:
   determining a first energy value of a first portion of the third audio data, the first energy value measured in decibels, the first portion of the third audio data corresponding to a first duration of time and including the first frequency band;
   determining a second energy value of the first portion of the fourth audio data, the second energy value measured in decibels;
   determining a first ratio value by subtracting the second energy value from the first energy value;
   determining a third energy value of a second portion of the third audio data, the third energy value measured in decibels, the second portion of the third audio data corresponding to a second duration of time and including the first frequency band;
determining a second ratio value by subtracting the first ratio value from the third energy value; and
determining the first SER value by subtracting the second ratio value from the first threshold value.

3. The computer-implemented method of claim 1, wherein generating the fifth audio data further comprises:
determining that the first SER value is below a third threshold value, the third threshold value representing a minimum acceptable SER value;
generating a first portion of the fifth audio data by multiplying the first portion of the fourth audio data by a value of zero;
determining that the second SER value is above the third threshold value;
determining an attenuation value using the second SER value, wherein the determining comprises:
determining a first value by converting the second SER value from a logarithmic scale to a linear scale,
determining a second value by adding a value of one to the first value, and
determining the attenuation value by dividing the first value by the second value; and
generating a second portion of the fifth audio data by multiplying the second portion of the fourth audio data by the attenuation value.

4. The computer-implemented method of claim 1, wherein receiving the plurality of threshold values further comprises:
receiving training audio data including multiple representations of the keyword;
determining a cumulative density function of energy of the training audio data that is within the first frequency band; and
determining the first threshold value by determining an amount of energy at a 99-percentile point in the cumulative density function.

5. A computer-implemented method, the method comprising:
determining a first energy value corresponding to a keyword and associated with a first frequency band;
determining a second energy value corresponding to the keyword and associated with a second frequency band;
generating first audio data;
determining, using the first energy value, a first signal quality metric value corresponding to a first portion of the first audio data that is within the first frequency band;
determining, using the second energy value, a second signal quality metric value corresponding to a second portion of the first audio data that is within the second frequency band;
determining that the first signal quality metric value satisfies a condition;
determining that the second signal quality metric value does not satisfy the condition; and
generating second audio data using the first audio data, wherein the generating the second audio data comprises:
generating a first portion of the second audio data by applying a first attenuation value to the first portion of the first audio data, and
generating a second portion of the second audio data by applying a second attenuation value to the second portion of the first audio data.

6. The computer-implemented method of claim 5, wherein generating the first audio data further comprises:
sending third audio data to at least one loudspeaker, wherein the at least one loudspeaker generates output audio corresponding to the third audio data;
receiving fourth audio data generated by at least one microphone, the fourth audio data including a first representation of the output audio and a first representation of speech;
generating, using the third audio data, fifth audio data including a second representation of the output audio; and
generating the first audio data by subtracting the fifth audio data from the fourth audio data, the first audio data including a second representation of the speech and a third representation of the output audio.

7. The computer-implemented method of claim 6, wherein determining the first signal quality metric value further comprises:
determining a first energy value of a first portion of the fifth audio data, the first portion of the fifth audio data corresponding to a first duration of time and including the first frequency band;
determining a second energy value of the first portion of the first audio data;
determining a first ratio value using the first energy value and the second energy value;
determining a third energy value of a second portion of the fifth audio data, the second portion of the fifth audio data corresponding to a second duration of time and including the first frequency band;
determining a second ratio value using the third energy value and the first ratio value; and
determining the first signal quality metric value using the first energy value and the second ratio value.

8. The computer-implemented method of claim 5, wherein determining the first energy value further comprises:
receiving training audio data including multiple representations of the keyword;
determining a cumulative density function of energy of the training audio data that is within the first frequency band; and
determining the first energy value by determining a value at a fixed percentile of the cumulative density function.

9. The computer-implemented method of claim 5, wherein determining that the first signal quality metric satisfies the condition further comprises:
determining that the first signal quality metric value is below a signal threshold value representing a minimum acceptable signal quality metric value;
identifying a group of signal quality metric values having lowest values of a plurality of signal quality metric values, a size of the group of signal quality metric values less than or equal to a first value representing a maximum number of frequency bands to select for additional processing; and
determining that the first signal quality metric value satisfies the condition by determining that the group of signal quality metric values includes the first signal quality metric value.

10. The computer-implemented method of claim 5, wherein determining that the first signal quality metric satisfies the condition further comprises:
determining a third signal quality metric value corresponding to the first audio data;

determining, using the third signal quality metric value, a first value representing a maximum number of frequency bands to select for additional processing;
identifying a group of signal quality metric values having lowest values of a plurality of signal quality metric values, a size of the group of signal quality metric values less than or equal to the first value; and
determining that the first signal quality metric value satisfies the condition by determining that the group of signal quality metric values includes the first signal quality metric value.

11. The computer-implemented method of claim 5, wherein generating the first portion of the second audio data further comprises:
setting, in response to determining that the first signal quality metric value satisfies the condition, the first attenuation value to zero; and
generating the first portion of the second audio data by multiplying the first portion of the first audio data by the first attenuation value.

12. The computer-implemented method of claim 5, wherein generating the first portion of the second audio data further comprises:
determining, in response to determining that the first signal quality metric value satisfies the condition, the first attenuation value using the first signal quality metric value; and
generating the first portion of the second audio data by multiplying the first portion of the first audio data by the first attenuation value.

13. The computer-implemented method of claim 5, wherein generating the first portion of the second audio data further comprises:
determining that the first signal quality metric value is above a signal threshold value;
determining the first attenuation value using the first signal quality metric value; and
generating the first portion of the second audio data by multiplying the first portion of the first audio data by the first attenuation value,
the method further comprising:
determining a third signal quality metric value corresponding to a third portion of the first audio data;
determining that the third signal quality metric value satisfies the condition;
determining that the third signal quality metric value is below the signal threshold value;
setting a third attenuation value to zero; and
generating a third portion of the second audio data by multiplying the third portion of the first audio data by the third attenuation value.

14. A system comprising:
at least one processor; and
memory including instructions operable to be executed by the at least one processor to cause the system to:
determine a first energy value corresponding to a keyword and associated with a first frequency band;
determine a second energy value corresponding to the keyword and associated with a second frequency band;
generate first audio data;
determine, using the first energy value, a first signal quality metric value corresponding to a first portion of the first audio data that is within the first frequency band;
determine, using the second energy value, a second signal quality metric value corresponding to a second portion of the first audio data that is within the second frequency band;
determine that the first signal quality metric value satisfies a condition;
determine that the second signal quality metric value does not satisfy the condition; and
generate second audio data using the first audio data, wherein the generating the second audio data comprises:
generating a first portion of the second audio data by applying a first attenuation value to the first portion of the first audio data, and
generating a second portion of the second audio data by applying a second attenuation value to the second portion of the first audio data.

15. The system of claim 14, wherein the memory further comprises instructions that, when executed by the at least one processor, further cause the system to:
send third audio data to at least one loudspeaker, wherein the at least one loudspeaker generates output audio corresponding to the third audio data;
receive fourth audio data generated by at least one microphone, the fourth audio data including a first representation of the output audio and a first representation of speech;
generate, using the third audio data, fifth audio data including a second representation of the output audio; and
generate the first audio data by subtracting the fifth audio data from the fourth audio data, the first audio data including a second representation of the speech and a third representation of the output audio.

16. The system of claim 15, wherein the memory further comprises instructions that, when executed by the at least one processor, further cause the system to:
determine a first energy value of a first portion of the fifth audio data, the first portion of the fifth audio data corresponding to a first duration of time and including the first frequency band;
determine a second energy value of the first portion of the first audio data;
determine a first ratio value using the first energy value and the second energy value;
determine a third energy value of a second portion of the fifth audio data, the second portion of the fifth audio data corresponding to a second duration of time and including the first frequency band;
determine a second ratio value using the third energy value and the first ratio value; and
determine the first signal quality metric value using the first energy value and the second ratio value.

17. The system of claim 14, wherein the memory further comprises instructions that, when executed by the at least one processor, further cause the system to:
receive training audio data including multiple representations of the keyword;
determine a cumulative density function of energy of the training audio data that is within the first frequency band; and
determine the first energy value by determining a value at a fixed percentile of the cumulative density function.

18. The system of claim 14, wherein the memory further comprises instructions that, when executed by the at least one processor, further cause the system to:

determine that the first signal quality metric value is below a signal threshold value representing a minimum acceptable signal quality metric value;

identify a group of signal quality metric values having lowest values of a plurality of signal quality metric values, a size of the group of signal quality metric values less than or equal to a first value representing a maximum number of frequency bands to select for additional processing; and determine that the first signal quality metric value satisfies the condition by determining that the group of signal quality metric values includes the first signal quality metric value.

19. The system of claim 14, wherein the memory further comprises instructions that, when executed by the at least one processor, further cause the system to:

determine a third signal quality metric value corresponding to the first audio data;

determine, using the third signal quality metric value, a first value representing a maximum number of frequency bands to select for additional processing;

identify a group of signal quality metric values having lowest values of a plurality of signal quality metric values, a size of the group of signal quality metric values less than or equal to the first value; and determine that the first signal quality metric value satisfies the condition by determining that the group of signal quality metric values includes the first signal quality metric value.

20. The system of claim 14, wherein the memory further comprises instructions that, when executed by the at least one processor, further cause the system to:

determine that the first signal quality metric value is above a signal threshold value;

determine the first attenuation value using the first signal quality metric value;

generate the first portion of the second audio data by multiplying the first portion of the first audio data by the first attenuation value;

determine a third signal quality metric value corresponding to a third portion of the first audio data;

determine that the third signal quality metric value satisfies the condition;

determine that the third signal quality metric value is below the signal threshold value;

set a third attenuation value to zero; and generate a third portion of the second audio data by multiplying the third portion of the first audio data by the third attenuation value.

* * * * *